United States Patent
Celestini

(10) Patent No.: US 7,878,409 B2
(45) Date of Patent: Feb. 1, 2011

(54) SYSTEM AND METHOD FOR VERIFYING IDENTITY DURING DATA ENTRY WITH A BARCODE SCANNER

(75) Inventor: Stefano Celestini, Oakville (CA)

(73) Assignee: Shoplogix Inc., Mississauga, Ontario (CA)

( * ) Notice: Subject to any disclaimer, the term of this patent is extended or adjusted under 35 U.S.C. 154(b) by 416 days.

(21) Appl. No.: 11/297,320

(22) Filed: Dec. 9, 2005

(65) Prior Publication Data

US 2007/0131774 A1    Jun. 14, 2007

(51) Int. Cl.
*G06K 7/10* (2006.01)
(52) U.S. Cl. .................................. 235/472.01
(58) Field of Classification Search ............ 235/462.45, 235/462.48, 472.01, 462.13
See application file for complete search history.

(56) References Cited

U.S. PATENT DOCUMENTS

| | | | | |
|---|---|---|---|---|
| 6,057,554 | A * | 5/2000 | Plesko | 250/566 |
| 6,088,585 | A * | 7/2000 | Schmitt et al. | 455/411 |
| 6,507,765 | B1 | 1/2003 | Hopkins et al. | |
| 6,834,807 | B2 | 12/2004 | Ehrhart et al. | |
| 6,896,187 | B2 | 5/2005 | Stockhammer | |
| 6,944,768 | B2 | 9/2005 | Siegel et al. | |
| 7,073,711 | B2 * | 7/2006 | Fernandez et al. | 235/382 |
| 2003/0150911 | A1 * | 8/2003 | Joseph | 235/382 |
| 2003/0195818 | A1 * | 10/2003 | Howell et al. | 705/26 |
| 2004/0046027 | A1 | 3/2004 | Leone et al. | |
| 2004/0111320 | A1 * | 6/2004 | Schlieffers et al. | 705/16 |
| 2004/0193316 | A1 | 9/2004 | Lunak et al. | |
| 2006/0054704 | A1 * | 3/2006 | Fitch et al. | 235/472.01 |
| 2008/0115981 | A1 * | 5/2008 | Bechtel | 178/19.01 |

OTHER PUBLICATIONS

Ingersoll-Rand Recognition Systems, Sep. 7, 2001, 2 pages, Ingersoll-Rand Company, http://www.handreader.com/news/pressreleases/2001_archives/010907.htm.
ID Automation,com, Inc., *Barcode Scanners-Laser, CCD and Images*, undated, 8 pages, www.idautomation.com.
Direct Dial.com, *Best Sellers (Barcode Products)*, undated, 7 pages, www.directdial.com.

* cited by examiner

*Primary Examiner*—Jamara A Franklin
(74) *Attorney, Agent, or Firm*—Neil Henderson

(57) ABSTRACT

A hand-held barcode scanner includes a fingerprint reader for reading fingerprint data from a digit of an operator of the barcode scanner. Preferably, an operator's digit can be comfortably placed on the fingerprint reader while the operator is scanning barcodes. This type of barcode scanner may be used with a system or method for verifying identity during data entry. A system includes the barcode scanner with fingerprint reader; a database storing identification data and fingerprint data for users; and a controller, which is in communication with the scanning element, the fingerprint reader and the database, that compares fingerprint data from a digit placed on the fingerprint reader with the database to obtain an identity of a user and then associates the identity of the user with barcodes scanned by the barcode scanner. The system may activate an alarm if the identity of the operator is not an authorized user.

4 Claims, 12 Drawing Sheets

SYSTEM AND METHOD FOR VERIFYING IDENTITY DURING DATA ENTRY WITH A BARCODE SCANNER

FIELD OF THE INVENTION

The present invention relates to a system and method for verifying identity during data entry with a barcode scanner, and more particularly relates to a system and method for biometric verification of identity during barcode scanning.

BACKGROUND OF THE INVENTION

There are currently a variety of methods for monitoring and controlling the motion and status of machines in manufacturing, production, and processing environments, such as factories, assembly plants, and the like. For example, processor-based controls, such as computer numerical controls (CNC), are used to control the motion of machines such as machine tools and robots that are used in a variety of manufacturing environments. Programmable logic controls (PLC) may also be used to control the motion of a machine in various environments. Older equipment may be controlled by relays and relay logic.

These types of controls focus primarily on machine operation and very little on other types of information that the machine can provide to others. Usually, a machine control is designed to communicate directly to an operator of the machine equipment. It provides the operator with the information necessary to run the machine and make changes to the machine as needed. If one wishes to collect and analyze machine productivity, maintenance, status, quality, signal, or alarm information in real-time or over an interval of time, this information is often not available or needs to be derived from raw signals. While in recent years some of this information is being collected automatically and sent to a central database or the like, the usual way to collect at least some of these types of information is manually by the operator. Typically, an operator records information manually on paper or manually enters information into a terminal on the factory floor. However, due to the high-level of human interaction required, this method is prone to inaccuracies. One solution designed to lessen the possibility of human error is to scan data using a bar code scanner. For example, in the area of error/quality tracking, the machine operator may be provided with a list of error types together with a related bar code on a laminated sheet. When an error occurs the operator selects the appropriate error type from the list and scans the related bar code.

In a manufacturing environment, it is often important to also track the identity (ID) of the operator that is handling a particular machine or entering particular types of data. This can be important in a situation in which there are a number of shifts, and many people may be operating a single machine and/or entering data related to machine operations. Methods of identifying individuals entering information include the scanning of an ID badge with the barcode scanner in advance of scanning an error code or the like. It is also possible to establish operator identity by cross-referencing times with operator shift schedules or the like. These methods of establishing operator ID can be inaccurate and/or time consuming.

A further issue in a manufacturing environment is confirming that only the proper personnel are entering particular types of data. This can be related to safety or audit concerns, time keeping issues, divisions of responsibility, or other reasons. While scanning of ID badges can provide some verification of ID, it is not a reliable method of verifying the identity of the operator because operators may exchange ID badges or the like.

As such, there is a need for an improved system and method for verifying identification during data entry.

SUMMARY OF THE INVENTION

According to an exemplary embodiment, there is provided a hand-held barcode scanner including: a fingerprint reader for reading fingerprint data from a digit of an operator of the barcode scanner; a scanning element for scanning a barcode to generate barcode data; and a processing system for processing the fingerprint data and the barcode data. Since the hand-held barcode scanner includes a fingerprint reader, an operator's identity can be tracked with a higher degree of accuracy since the operator must generally be present for their fingerprint data to be input.

In a particular case, the fingerprint reader is positioned on the barcode scanner such that the digit can be comfortably or ergonomically placed on the fingerprint reader while the barcode scanner is operated.

In another particular case, the hand-held barcode scanner may further include an activator for causing the scanning element to scan a barcode. In this case, the fingerprint reader is positioned on the barcode scanner such that the digit can be comfortably or ergonomically placed on the fingerprint reader when the activator is. activated. In particular, if the activator is operated by a digit, the fingerprint reader may be positioned on the barcode scanner such that the fingerprint reader digit can be placed on the fingerprint reader while another digit of the same hand simultaneously operates the activator. In some applications it may be preferable if the fingerprint reader is positioned on the activator.

In another particular case, the processing system may include a communication subsystem for sending the fingerprint data and the barcode data to an external device. In this case, the hand-held barcode scanner may further include a memory, wherein the processing system stores the fingerprint data and the barcode data in the memory before the communication subsystem sends the fingerprint data and the barcode data to the external device. In these cases, the barcode scanner acts as a data acquisition device for sending fingerprint data and barcode data to an external device, which can compare the fingerprint data to a database of known or authorized users to check and verify the identity of the operator.

In another particular case, the hand-held barcode scanner may further include a memory and a database of user identification data and associated fingerprint data stored in the memory wherein the processing system compares the read fingerprint data to entries in the database to determine identification data for the operator, and, if identification data is available, the processing system process the identification data in association with the fingerprint data and the barcode data. In this case, the processing system may control the barcode scanner such that the barcode scanner will not operate unless the identification data is indicated as an authorized user of the barcode scanner. In this configuration, the hand-held barcode scanner can verify identity locally rather than by sending the fingerprint data to an external device for verification of identity.

In yet another particular case, the fingerprint reader and the barcode scanner are controlled by the processing system such that the barcode scanner will not operate unless a digit is placed on the fingerprint reader.

According to another exemplary embodiment, there is provided a system for verifying identity during data entry The system includes: a barcode scanner for scanning barcodes for data entry; a fingerprint reader fixedly attached to the barcode scanner; a database including identification data for users and fingerprint data for the users; and a controller, which is in communication with the barcode scanner, the fingerprint reader and the database, that compares fingerprint data from a digit placed on the fingerprint reader with the database to obtain identification data of a user and then associates the identification data with barcodes scanned by the barcode scanner.

In a particular case, the fingerprint reader is positioned on the barcode scanner such that the digit can be comfortably or ergonomically placed on the fingerprint reader while the barcode scanner is operated.

In another particular case, the system may further include an activator for causing the barcode scanner to scan a barcode. In this case, the fingerprint reader is preferably positioned on the barcode scanner such that the digit can be comfortably placed on the fingerprint reader when the activator is activated. In a particular aspect of this case, the fingerprint reader may be positioned on the barcode scanner such that a digit can be placed on the fingerprint reader while another digit of the same hand operates the activator. In another aspect, the fingerprint reader may be positioned on the activator.

In another particular case, the controller controls the barcode scanner such that the barcode scanner will not operate unless the identity of the operator matches with an entry in the database.

In yet another particular case, the controller controls the fingerprint reader and the barcode scanner such that the barcode scanner will not operate unless a digit is placed on the fingerprint reader.

According to another exemplary embodiment, there is provided a method for verifying identity during data entry with a barcode scanner. The method includes: monitoring for placement of a digit on a fingerprint reader by an operator of the barcode scanner; reading fingerprint data of the operator with the fingerprint reader; determining identification data representing an individual based on the fingerprint data; and recording the identification data, if any, in association with data entered using the barcode scanner.

In a particular case, the method may further include: determining if the fingerprint data matches that of an authorized user; and allowing data to be entered using the barcode scanner only if the fingerprint data matches that of an authorized user. In this case, the method may further include activating an alarm when the fingerprint data does not match that of an authorized user. The activating an alarm may include notifying a supervisor. The activating an alarm may alternatively or also include locking the barcode scanner to prevent further data entry until an unlocking code is entered.

In another particular case, the method may include notifying the operator to clean the digit and retry when the fingerprint data does not match that of an authorized user.

BRIEF DESCRIPTION OF THE DRAWINGS

For a better understanding of the present invention, and to show more clearly how it may be carried into effect, reference will now be made, by way of example, to the accompanying drawings which aid in understanding an embodiment of the present invention and in which.

DETAILED DESCRIPTION OF THE INVENTION

This section begins with a general description of a computer-assisted system and method for remotely monitoring and controlling machines in a wide variety of environments and then moves on to more specifically describe a system and method for verifying identity (ID) during data entry in the context of the computer-assisted system. The computer-assisted system is described in more detail in U.S. patent application Ser. No. 10/700,671, to Celestini, filed Nov. 5, 2003, entitled SELF-CONTAINED SYSTEM AND METHOD FOR REMOTELY MONITORING MACHINES and which is hereby incorporated herein by reference.

The computer assisted system facilitates remote monitoring of machines via a self-contained machine monitoring device (MMD) which is connected to one or more client computing devices (CDs) on a network. The MMD is a compact device containing a processing engine, a server for generating displays and user interfaces, a database system, and machine and network connectivity capabilities. The MMD provides all machine and network connectivity, machine input and output, data storage and processing, reporting, user interface generation, and system configuration capabilities. As such, it furnishes a complete, self-contained, and compact system, readily attachable to almost any machine. Since the MMD provides self-contained data storage, processing, configuration and reporting services, it is not dependent on external computers for any of these functions, but remains capable of transmitting reports for archival storage on a CD if desired, thus increasing reliability and reducing network traffic. In fact, for all functions, the MMD constitutes a self contained unit that acts as a server to the CDs. The CDs, in turn, act as client mechanisms for remotely requesting, storing and viewing report data and remotely entering and viewing MMD configuration information.

Figure 1:
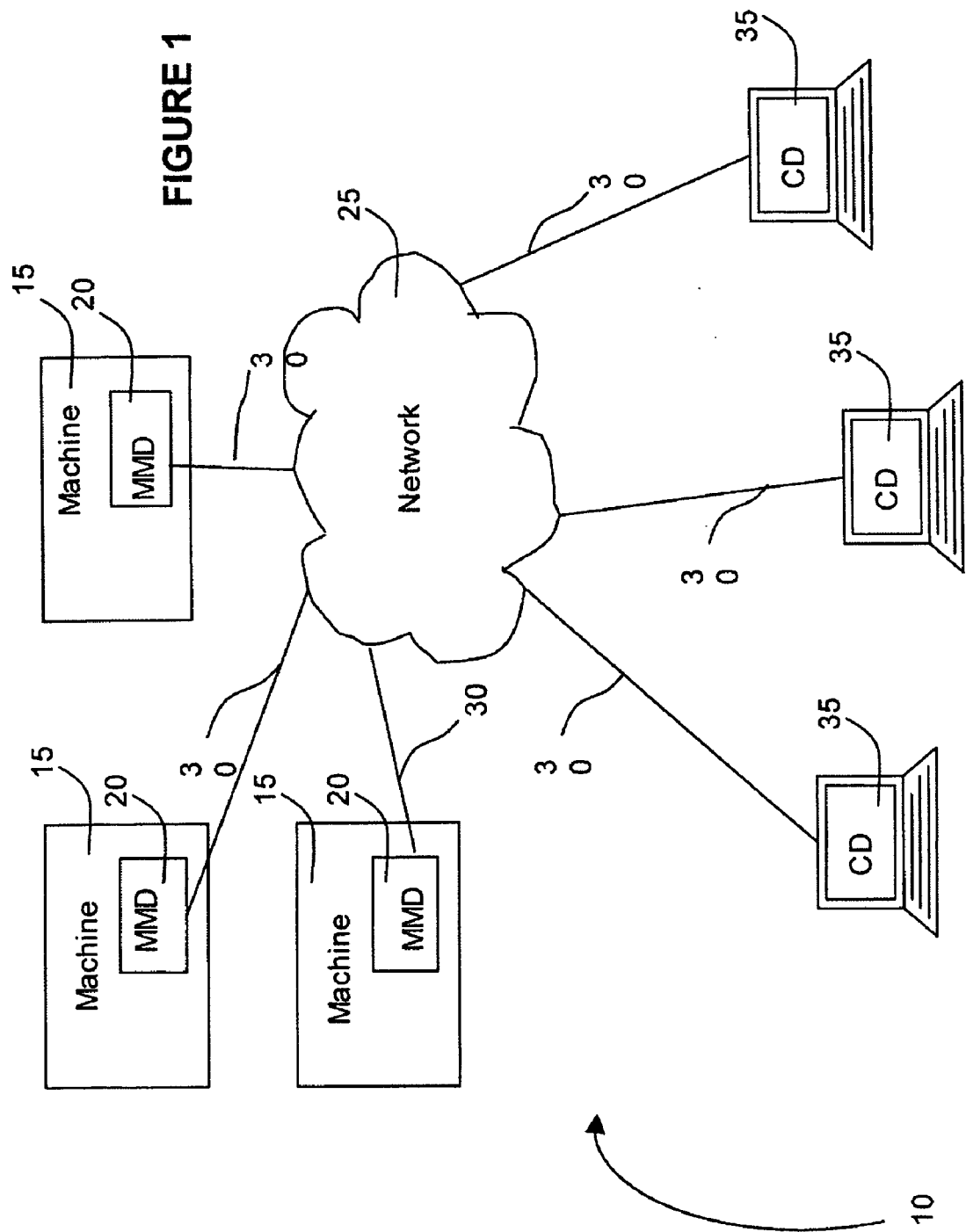
FIG. 1 is a block diagram of a system representing an environment for embodiments of the present invention.

FIG. 1 shows a block diagram of a computer assisted system 10. One or more machines 15 is connected to an MMD 20. A machine 15 may comprise a device of any type, as long as the device provides outputs and, if desired, inputs that may be attached to the MMD 20. These outputs and inputs may include, for example, digital inputs, digital outputs, analog inputs, analog outputs, serial communications, and network, such as Ethernet, communications. As such, machines 15 may include any devices having simple digital or analog outputs, Programmable Logic Controls (PLCs), Computer Numeric Controls (CNCs), Ethernet ports, or serial ports for RS 232/

RS485 connections, among others. Further, system 10 may include one or more barcode scanners (not shown in FIG. 1 but described in further detail below), which may be attached to one of the inputs of MMD 20 or which may be an element of machine 15 and machine 15 may provide information from the barcode scanner to the MMD 20 through a machine input. The MMD 20 may generate MMD 20 output signals, such as digital output signals or the like, in response to data received from the machine 15 and processed by the MMD 20, which may be transmitted on the MMD 20 to any machine 15 attached to an MMD 20 output connector, MMD 20 serial ports, or MMD 20 network ports. These MMD 20 output signals may be used for a variety of purposes, including, for example, pausing a machine 15, stopping a machine 15, and instructing a machine 15 to continue operation, as well as activating or deactivating user notification devices such as lights, buzzers or the like. Other types of inputs to the MMD 20 and outputs from the MMD 20 are possible. It is not the intention of the inventors to limit input and output types and their possible uses to a given connection type, communication protocol, or specific type of machine 15.

Each MMD 20 is attached to a network 25 and acts as a server for all machine 15 control and monitoring functions. The network 25 used may be a local area network, wide area network, an intranet, the Internet, wireless network, or any combination of the aforementioned network types. However, the network types mentioned serve only as examples. It is not the intent of the inventors to restrict the use of the present invention to a specific network type or protocol.

Data from the MMD 20 is transmitted over a data link 30 from the MMD 20 to the network 25 where it is transported to a client computing device (CD) 35 via a data link 30 from the network 25 to the CD 35. The CD 35 may be any type of computing device capable of receiving, transmitting, and displaying data in the format provided by the network 25 and the MMD 20. A CD 35 may comprise, among other devices, personal computers, handheld computers, personal data assistants (PDA), and cellular phones. The data links 30 between the MMD 20 and the network 25 and the CD 35 may be either wireless data links or wire line data links, provided they can carry data in the protocol used by the MMD 20 and the CD 35.

The CD 35 is used for remotely configuring the MMD 20, for remotely requesting and viewing reports from the MMD 20, and for receiving copies and back-ups of report data in another format if desired. All configuration and report requesting and viewing transactions are carried out via user interfaces generated by the MMD 20. MMD 20 handles all of the instructions, processing, configuration requests, report generation, and data storage. The MMD 20 also generates all back-up report data that may eventually be sent to a CD 35 on the network 25, MMD 20 output signal generation, as well as e-mail notifications in response to given machine 15 inputs, such as alarms, depending on the MMD 20 configuration. Reports and configuration information are requested by users and displayed via user interfaces generated by the MMD 20 and transmitted to a CD 35 where the user views reports and configuration information. Configuration information and report request parameters are also entered via user interfaces generated by the MMD 20. Thus, the MMD 20 handles all data processing, configuration, monitoring, user interface generation, and reporting and constitutes a self-contained unit for all such services. As such, the MMD 20 acts as a server to the CDs 35. The CD 35 is only used for inputting requests, displaying results output by the MMD 20, and for archiving of MMD 20 reports on a CD 35 elsewhere on the network 25, if desired.

The user interfaces for entering report requests and configuration information and for viewing the reports and configuration information are comprised of web pages in world wide web format wherein configuration information and report requests are entered and configuration and reports requested are displayed in a web browser on a user's CD 35. These web page user interfaces use Hypertext Markup Language (HTML) to control the overall layout of the user interfaces, Extensible Markup Language (XML) to define the data structures used for inputs and outputs to the user interfaces, and JAVA programming applets to display any requested reports in graphical format. Reports may also automatically output, without user viewing, to a CD 35 on the network 25 in a format such as comma separated values (CSV) or in Microsoft Excel™ format for archiving purposes or use by other applications.

In addition, a designated MMD 20 can monitor the running status of all of the other MMDs 20 and provide a web page user interface that facilitates access to reports on any MMD 20 connected to the network 25. Upon user request, the designated MMD 20 generates a web page user interface viewable on a CD 35, that contains a list, for example a hierarchal tree, of all the MMDs 20 within a frame on the web page. The user may then select the MMD 20 attached to the machine 15 that the user wishes to view from the list, which causes the selected MMD 20 to generate a web page to allow the user to view/select reports available on the MMD 20 chosen in another frame on the web page designated for report viewing. It is also possible for a designated MMD 20 to generate reports that compile data from reports output from multiple MMDs 20.

The user interfaces, report formats, and language tools used to generate the user interfaces for the present disclosure are exemplary. The user interfaces used and generated by the MMD 20 for presenting reports to the user and for entering configuration and report requests may be of any type that may be readily displayed by the CD 35. It is not the intent of the inventors to restrict the use to a given reporting type format, user interface mechanism, or language for developing and displaying reports or user interfaces. Thus, it is not the intent of the inventors to limit user interfaces to interfaces in the form of world wide web pages or to limit the type of server to a world wide web server that generates such interfaces in the form of world wide web pages.

Figure 2:
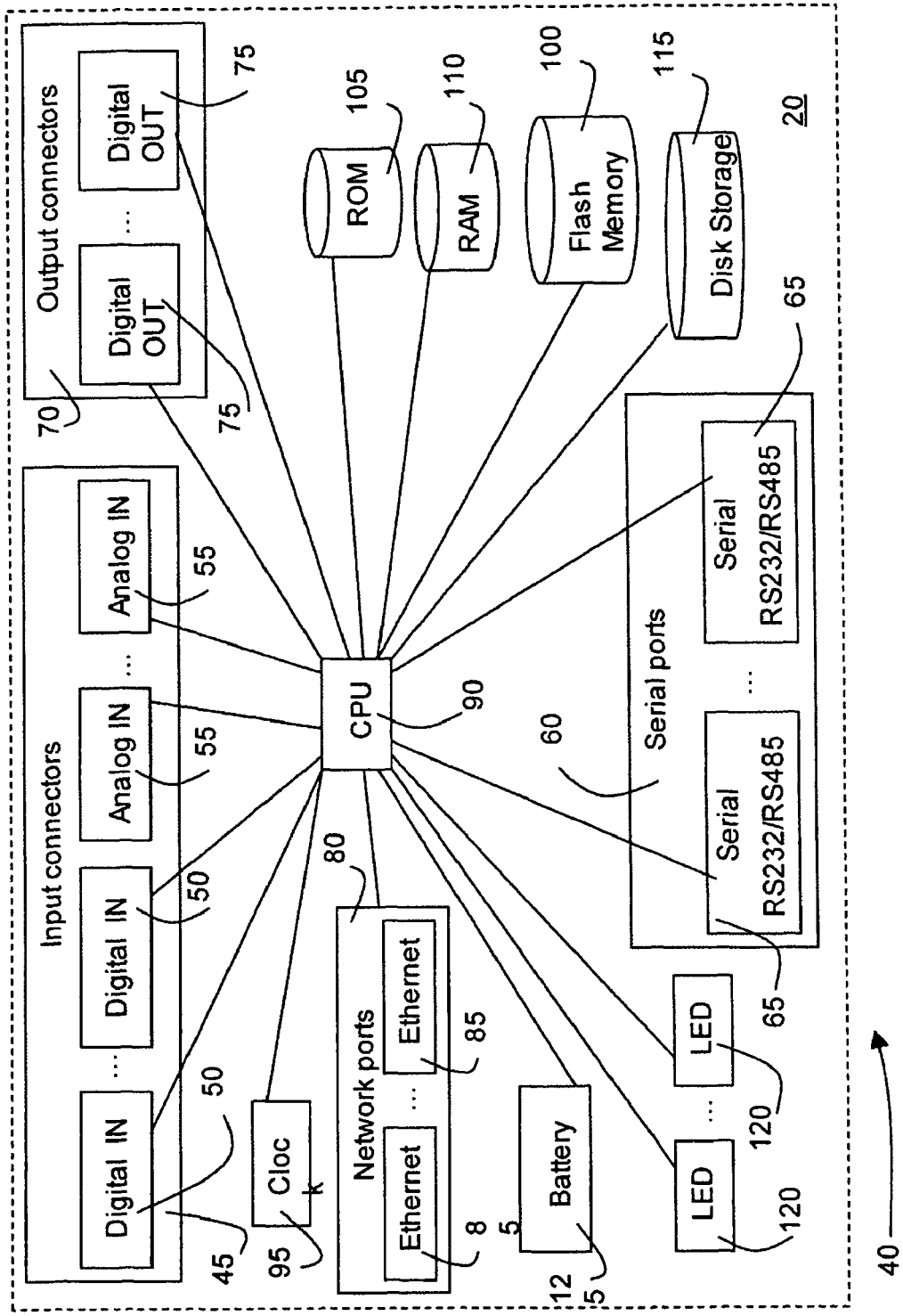
FIG. 2 is a block diagram of hardware components of an MMD.

Referring now to FIG. 2, a block diagram of the hardware components of the MMD is shown generally as 40. The MMD 20 contains a variety of connectors and ports for inputs from, and outputs to, a machine 15. Input connectors 45 may include digital input connectors 50 which assure that the MMD 20 can receive digital inputs, i.e. inputs in digital format, from the connected machine 15. Similarly, the MMD 20 may possess one or more analog input connectors 55 which allow the MMD 20 to receive analog inputs, i.e. inputs in the form of analog signals. The MMD 20 may also include one or more serial ports 60, such as RS232 or RS485 (COM) ports 65 or the like, for serial communications, including serial input and serial output, with machines 15 capable of using such serial ports 60. These serial ports 60 are also used for handling serial protocol communications. This may include, for example, communication from manual input devices such as handheld terminals and barcode scanners as well as outputs to Light Emitting Diode (LED) display boards. Other input or output ports, including wireless, may also be used for handheld terminals or barcode scanners depending on the nature of the handheld terminal or barcode scanner. The MMD 20 may also contain one or more output connectors 70, such as a digital output connector 75, for sending MMD 20 output signals, such as instructions to a connected machine 15 or other connected device, such as a barcode scanner-or the like. Finally, one or more network ports 80, such as an Ethernet port 85 or the like, on the MMD 20 provide for network communications to CDs 35 or machines 15 capable of using network protocols. Machines 15 capable of using network protocols, such as Ethernet or the like, may be indirectly connected to the MMD 20 by communicating with the MMD 20 over the network 25.

The MMD 20 also contains a number of elements that allow the MMD 20 to act as a self-contained computing device. Instructions and operations for MMD 20 are controlled by a Central Processing Unit (CPU) 90. Synchronization of activities and instructions are carried out by reference to a real time clock 95. MMD 20 and machine 15 data is stored in flash memory 100, read-only-memory (ROM) 105, random-access-memory (RAM) 110, on an internal disk 115, or other storage media, not shown, internal to the MMD 20. The MMD 20 may also have one or more LEDs 120 for indicating MMD 20 power status and the status of various MMD 20 input connectors 45, output connectors 70, serial ports 60 and network ports 80.

In one example, the MMD 20 comprises a plurality of digital input connectors 50, a plurality of analog input connectors 55, a plurality of serial RS232 ports 65, one software selectable serial RS232/RS485 port 65, and a plurality of digital output connectors 75. Configuration information is stored in the read/write flash memory 100, which allows for preservation of configuration information in the event of a power failure. A long-life battery 120 functions as a power back-up mechanism and ensures that the MMD 20 can continue functioning in the event of a power failure. The MMD 20 reads and stores other useful data via ROM 105 and RAM 110, or disk storage 115. Should connections to the network 25 cease to function, this data can be forwarded on to a CD 35 when network 25 connections are re-established. Thus, the MMD 20 may retain its configuration information and continue temporarily to monitor the machine 15, without data loss, even in the event of a power or network 25 failure. The MMD 20 also includes a plurality of MMD LEDs 120 for indicating the status of the input voltage, digital input connectors 50, digital output connectors 75, COM 1 serial (RS232/RS485) port 65, and network connectivity via the Ethernet port 85. The Ethernet port 85 may also be used to communicate with machines 15 capable of Ethernet communications. Other than a CD 35, machines 15 capable of Ethernet communications will often not be directly attached to the MMD 20. Rather, they will communicate with the MMD 20 over the network 25. As one skilled in the art will recognize, however, other combinations for use of memory, battery 180 backup capability, input connectors 45, output connectors 70, serial ports 60, network ports 80, and use of LEDs 120 are possible.

Figure 3:
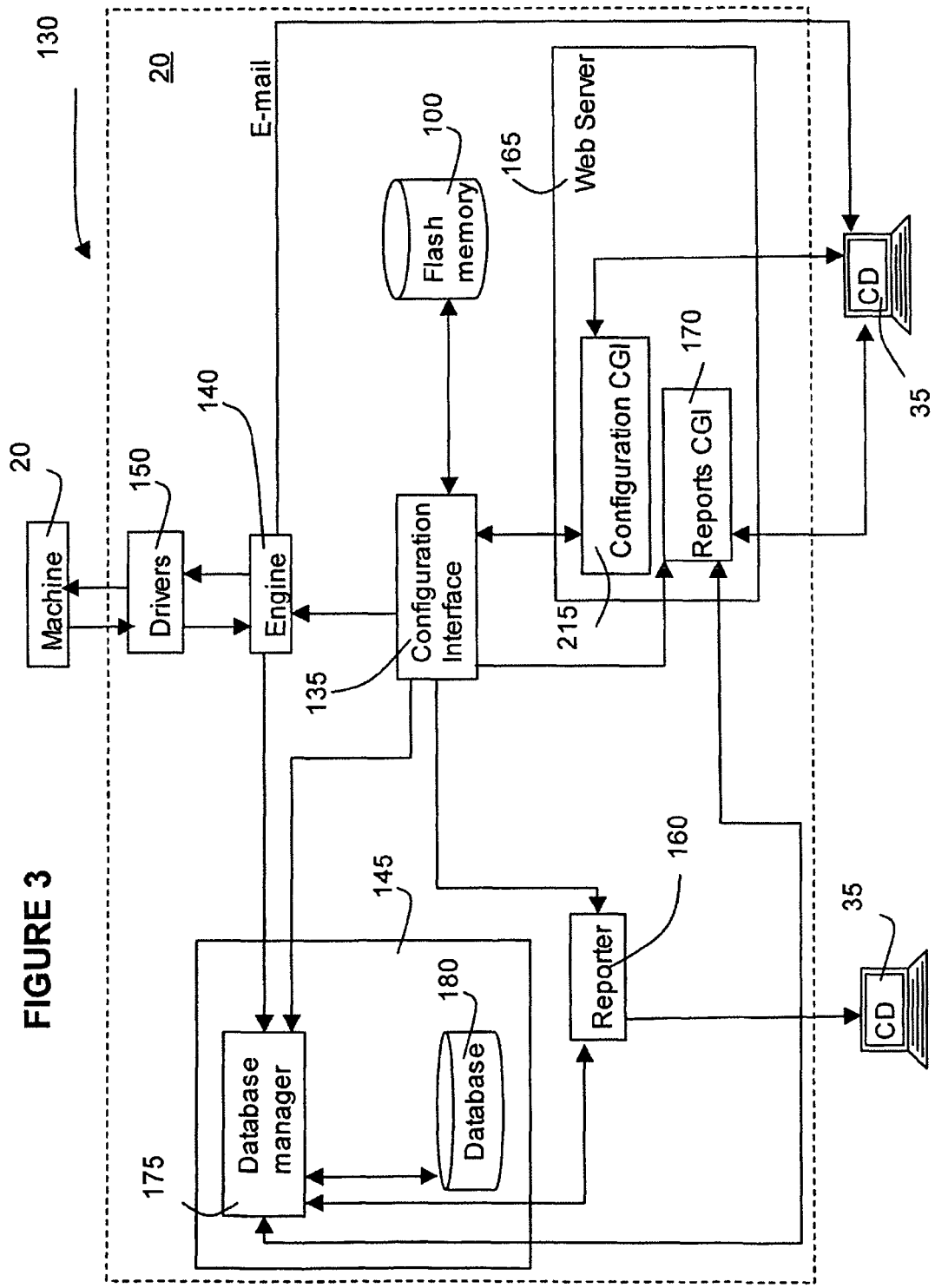
FIG. 3 is a logical flow diagram of software modules of the MMD.

Reference is now made to FIG. 3, a logical flow diagram of the software modules (shown generally as 130) of the MMD 20. To aid the reader in understanding the logical flow of the modules of MMD 20, we will also be referring to features of FIG. 2.

In brief, the software modules are comprised of the following: a configuration interface module 135 for managing configuration information, an engine 140 for performing transformations on inputs and generating outputs based on the inputs, a database system 145 for storing report data, drivers 150 for translating machine inputs to a format useable by the engine and engine outputs for use by machines, a reports CGI module 155 and reporter module 160 which generate reports, and a web server 165 or the like for generating user interfaces for requesting and viewing reports and for entering and viewing configuration information, as well as handling all input from the user interfaces. The reports CGI module 155 is comprised within the web server 165 and specifically handles all user requests for reports and outputs the reports in the form of web page user interfaces. The web server further comprises a configuration CGI module 170 which specifically handles generation of web page user interfaces for entering and viewing configuration information. The database system 145 is further comprised of a database manager 175 and a database 180. The database manager 175 reads and writes data to the database 180 which stores the actual information required for report generation. These modules are explained in greater detail below.

The configuration interface module 135 stores and manages the MMD configuration information, which is stored for example, in flash memory 100. The configuration information is determined primarily as a function of the reports that must be generated and includes variable names for inputs from machines and outputs required for reports, transformations to be performed by the engine, structure of the database 180 within the database system 145, report formats, and queries.

The configuration interface module 135 is preferably the only module that can read or write to the flash memory 100 that contains the configuration information. Thus, the configuration interface module 135 is used for reading and writing of configuration information for the MMD 20 to the flash memory 100 during the initial MMD 20 configuration and after configuration changes. As such, the configuration interface module 135 interacts with the configuration CGI module 170, which generates the web page interface through which the user enters and views configuration information on the CD 35. The configuration CGI module 170 transmits configuration information entered by the user to the configuration interface module 135, which then writes this information to the flash memory. In addition, the configuration interface module 135 also supplies all necessary configuration information, by reading from the flash memory 100, to all other modules after configuration changes or during MMD 20 initialization. The other modules receive this information during initialization and store it in memory for subsequent use. Thus, once the other modules have been initialized with the configuration information, the configuration interface module 135 does not need to provide this information again unless there is a change in configuration or system re-start, such as after a power failure, etc. By using the configuration interface module 135 as an intermediary between all other modules and the configuration information stored in the flash memory 100, the MMD 20 ensures that each module is furnished with the configuration information required for the module's tasks and that only one module accesses the configuration information in the flash memory 100 at any given moment.

The configuration interface module 135 may also maintain, as part of the configuration information or the like, a database of user names and passwords. The user names database may include further information indicative of ID such as fingerprint data or the like. Users may thus use these passwords, from web page user interfaces, to obtain access to the system and view and modify system configuration information as required for the daily use of the system. Different levels of access and modification permissions are accorded to users based on their classification as belonging to a group having certain access and modification rights. For example, there could be three groups of users, such as basic users, administrators, and integrators, with basic users having the least rights, administrators having additional rights, and integrators having the most rights. In this manner, the ability to effect necessary modifications to the configuration information is ensured while maintaining security.

The engine 140 monitors machine inputs via the drivers 150 for changes to determine whether the value received for a given input is the same as the previous value received for that input, in which case an input change is detected. More specifically, the drivers 150 receive the inputs from the digital input connectors 50, analog input connectors 55, and serial RS232/RS285 ports 65 and translate them into a format useable by the engine 140. For each input, there is a variable associated with the input's value. The engine 140 compares the last value received for each input, as contained in the variable associated with the input, with the current value of the input.

If an input change is detected, the engine 140 may apply transformations to the input value for which an input change has been detected. These transformations may include basic mathematical transformations such as multiplication or division, Boolean logic, comparison with other values, and transformation for measuring and comparing inputs or variables over a given period of time. An example of possible transformations is shown in Table 1.

mations, using a number of intermediate variables, until the result required for inclusion as a field in a report or for display as a graph in a report, referred to as a report variable, is calculated. Variables required for such displays are referred to as report variables. When the engine 140 is finished processing the input change, it forwards the results, i.e. any resulting report variables, to the database manager 175. Only changes in the value of report variables, referred to as report variable changes, need to be transmitted by the engine 140 to the database manager 175 for storage in the database 180.

In this embodiment, by limiting any transformations on inputs with a view to transmission to the database manager 175 to those cases where an input change is detected, as opposed to using more traditional methods of processing and storing all inputs on a constant basis, the engine 140 consumes less resources. The fact that only report variable changes are sent by the engine to the database manager 175 and recorded in the database 180 further minimizes storage requirements and processing resources required. However, since the engine 140 is constantly monitoring all inputs received from the machine 15, input changes are detected and

TABLE 1

| Operation | # of inputs | Result Variable Value |
|---|---|---|
| Copy | 1 | copy of the input variable |
| Invert | 1 | Boolean inverse of the input variable |
| Bitwise Invert | 1 | bitwise invert of the input variable |
| Absolute Value | 1 | absolute value of the input variable |
| Plus + | 2 | Input1 + Input2 |
| Minus − | 2 | Input1 − Input2 |
| Multiplied By * | 2 | Input1 * Input2 |
| Divided By / | 2 | Input1/Input2 |
| Less Than < | 2 | TRUE if Input1 < Input2 otherwise FALSE |
| Greater Than > | 2 | TRUE if Input1 > Input2 otherwise FALSE |
| Less Than or Equal To <= | 2 | TRUE if Input1 <= Input2 otherwise FALSE |
| Greater Than or Equal To >= | 2 | TRUE if Input1 >= Input2 otherwise FALSE |
| Is Equal To == | 2 | TRUE if Input1 = Input2 otherwise FALSE |
| Is Not Equal To != | 2 | TRUE if Input1 != Input2 otherwise FALSE |
| And | 2 | TRUE if Input1 is TRUE and Input2 is TRUE otherwise FALSE |
| Or | 2 | TRUE if Input1 is TRUE or Input2 is TRUE or both are TRUE otherwise FALSE |
| Exclusive Or | 2 | TRUE if only Input1 is TRUE or only Input2 is TRUE otherwise FALSE |
| Round | 2 | Rounds Input1 to accuracy specified by Input2 |
| Value Sampling | 2 | Copies Input1 but only at fixed time intervals which are specified by Input2 |
| Deadband | 2 | Copies Input1 but only if its value has changed by the amount specified by Input2 |
| Timer (seconds) | 1 | # of seconds that Input1 has been TRUE for |
| Counter | 1 | # of times that Input1 has been TRUE |
| Limit Output Range | 3 | Copies Input1 but only if its value is within the specified Lower Limit and Upper Limit |
| Max Over Time | 2 | maximum value that Input1 has had over the time period specified by Input2 |
| Min Over Time | 2 | minimum value that Input1 has had over the time period specified by Input2 |
| Spread Over Time | 2 | maximum value that Input1 has had over the time period specified by Input2 |
| Count Over Time | 2 | # of times that Input1 has been TRUE over the time period specified by Input2 |
| Average Cycle Time | 2 | ratio of seconds to # of times that Input1 has been TRUE over the time period specified by Input2 |

The result of each transformation is another variable designated to hold the value of the result of the transformation. As such, an input change may undergo a number of transforvariable changes are calculated and stored almost instantly, thus ensuring precision of the MMD 20 reports is not compromised.

The engine 140, may also generate engine outputs in the form of MMD 20 output signals and e-mail notifications in response to inputs from machines 15, whether there has been an input change or not, or in response to the result of transformations undertaken by the engine 140 in response to an input change. For example, the engine 140 could generate instructions to activate or deactivate a PLC, relay, or LED that would be sent, via the drivers 150, over a digital output connector 75. E-mail notifications may be sent with a time delay, or to one or more recipients, the identity and quantity of recipients also being dependent on the results of the handling of the input. Such e-mails would generally be sent via the Ethernet port 85.

Variable names and the exact transformations applied by the engine 140, are dependent on the reports which must be made available and instructions for handling inputs, both of which are set out in the configuration information. This information is transmitted to the engine 140 by the configuration interface module 135 when the engine 140 is initialized or after a configuration change. The engine 140 may also use thresholds provided in the configuration information during transformation of the input change to determine whether the resulting variable is significant enough to be handled/transformed further and transmitted to the database manager 175 or not. Engine outputs, namely digital outputs for MMD 20 output signals and e-mail notifications performed by the engine 140, are also governed by the configuration information.

The database 180 is the general repository for information, including report variables required for generating the reports. It receives and outputs information via the database manager 175. The database manager 175 is preferably the only module that has direct access to the database 180. All other modules that need read/write access to the database 180 must use the database manager 175. In this fashion, the database manager 175 ensures that only one module can access data from the database 180 at any given time, thus ensuring that data integrity is not compromised by one module writing to the database 180 while another module is reading from it.

In particular, the database manager 175 may execute queries, such as Structured Query Language (SQL) queries, received from the reports CGI module 155 and reporter module 160 and extracts and processes data from the database 180 as required by the queries. The database manager 175 then forwards the results of these queries, generally as collections of records, to the reports CGI module 155 and reporter module 160 which output them as required.

The contents and structure of the database 180 are dependent on variables such as the data inputs from the machine 15, the transformations and report variable changes resulting from treatment by the engine 140, and the database 180 structure. The database structure is based on the report variables, which must be stored so as to be entered in fields or displayed as graphs in the desired reports as set out in the configuration information. The database manager 175 establishes the database 180 structure, in accordance with this configuration information, and reads and writes records and fields of the database 180 in accordance with this structure. The configuration information is transmitted to the database manager 175 by the configuration interface module 135 upon initialization of the database manager 175 after powering up the MMD 20 or after a configuration change. For each report specified in the configuration information, there is a corresponding table in the database 180. Each report variable, as established in the report configuration information, constitutes a field within each record of the table assigned to that report. Each record within a table captures all of the values for the report variables required for the record as well as the time at which these variables held that value. New records are input to a table in the database 180 only when there is a change in one or more report variables required for the record. In this manner, processing resources and storage space required for the database 180 are reduced.

For example, suppose a report indicating whether a machine 15 is running or not is set out in the report configuration information. Upon initialization, the configuration interface module 135 will transmit the names of the report variable used to capture the running status to the machine 15 for display in the report and an identifier for the report to the database manager 175. The database manager 175 will then execute an SQL command to cause a table bearing the identifier's name to be created in the database 180. Each record in the table will include a field for the value of the report variable that represents the running status of the machine 15, as well as a field for the time at which the report variable for the running status of the machine 15 acquired that value. When the value for the report variable changes, after processing by the engine 140 and submission of the new value to the database manager 175, the database manager 175 causes a new record to be created in the table which captures the new value and the time at which the change in value occurred.

Although the present example makes use of a relational database, it is not the intention of the inventors to restrict the database 180 or database manager 175 to a. relational format. A person skilled in the art will recognize that other formats for the database 180 and database manager 175 are possible.

The drivers 150 are responsible for handling inputs from and outputs to machines 15 connected to the MMD via the digital input connectors 50, analog input connectors 55, digital output connectors 75, Ethernet port 85, and serial RS232/RS485 ports 65. As such, the drivers 150 can handle digital inputs, analog inputs, and serial communications and provide such inputs in a format useful to the engine 140. In turn, the engine 140 uses drivers 150 to forward the engine 140 outputs that the engine 140 generates to the appropriate output connectors 70, RS232/RS485 serial ports 65, or Ethernet port 85. For example, MMD 20 digital output signals could be transmitted to a machine 15 connected to a digital output connector 75 via drivers 150.

The web server 165 generates all user interfaces and handles all input and output to them. The interfaces are displayed as web pages in a web browser on a CD 35, from which the user enters information into the web page and views results. More specifically, the web server 165 generates web page user interfaces for requesting reports and entering report parameters. This functionality is ensured by the reports CGI module 155 which is comprised within the web server 165. In addition, the web server 165 also ensures generation of web page user interfaces for entering and viewing the configuration information via the configuration CGI module 170, also comprised within the web server 165. It should be noted that the configuration CGI module 170 and reports CGI module 155 do not necessarily have to be implemented within the web server 165 and could instead be implemented as external modules to the web server 165, yet resident on the MMD 20, that would provide data from which the web server 165 would generate and transmit the required web page user interfaces. It is not the intention of the inventors to restrict the exact placement within the MMD 20 of the reports CGI module 155 or configuration CGI module 170 with regard to the web server 165.

The reports CGI module 155 is a module that generates reports and which is comprised within the web server 165. The reports CGI module provides a user friendly, web page interface for generating MMD 20 reports on the connected machine's 15 status. When a user requests to view the reports available for a machine 15, the reports CGI module 155 generates a web page containing a menu of reports to view. The user may then select a report and enter the desired report parameters into the web page interface provided by the reports CGI module 155 to the CD 35 for the report selected. The parameters typically involve time intervals, referred to as shifts, for monitoring the machine 15 between a scheduled start and end time for workers or machines 15. The reports CGI module 155 then uses the parameters input by the user to generate an SQL query which is sent to the database manager 175. The database manager 175 executes the query to obtain the desired information from the database 180 and transmits the results to the reports CGI module 205. The reports CGI module 155 uses this information to generate a web page containing the selected report which is transmitted to the user's CD 35. The contents and structure of the reports, which dictate the SQL queries, are output to the reports CGI module 155 by the configuration interface module 135 during initialization.

The reports CGI module 155 is capable of modifying reports in real-time in response to changes in inputs, as handled by the engine 140 and database manager 175 and set out during configuration, to allow a user to see changes as they occur. Using templates that set out each basic type of report, the reports CGI module 155 generates HTML files to control the appearance of the web pages, java applets to generate graphs, and XML files to contain and describe data structures used by the reports.

The reporter module also generates reports. However, reports generated by the reporter module 160 are not requested and displayed via user interfaces generated by the reports CGI module 155 of the web server 165. Rather, if so configured, the reporter module 160 automatically generates and writes backups of all MMD 20 reports to a CD 35 on the network 25 at pre-determined time intervals. The time intervals, contents of the reports, and format of the reports are output to the reporter module 160 by the configuration interface module 135 during initialization. The reporter module 160 uses this information to generate an SQL query at the pre-configured time intervals and transmits the query to the database manager 175. The database manager 175 executes the query to obtain the desired information from the database 180 and transmits the results to the reporter module 160. The reporter module 160 then uses this information to generate a report which it transmits to the designated CD 35 on the network. The report may be output in a format such as Microsoft Excel or CSV format, depending on the configuration information. Reports can be stored on the designated CD 35 either as a single continuous file for all reports or as a separate file for each period of time, which may represent a work shift within the production environment, defined in the configuration information.

The configuration CGI module 170 provides an easy to use, user-friendly web page user interface for configuring all of the MMD 20 settings. It is comprised within the web server 165. More specifically, the configuration CGI module 170 generates HTML web pages into which configuration information may be entered or viewed. These web pages are created based on templates which contain the basic web page structure for each type of configuration information to be entered or displayed. Using the templates, the configuration CGI module 170 generates HTML files to control the overall appearance of the configuration web pages while storing data structure information required for the web pages in XML files. The user enters configuration information in the web page interface transmitted to the CD 35 via the configuration CGI module 170. In addition, the configuration CGI module 170 also allows a user to upload or download existing configurations to/from a networked CD 35. Once the configuration information is entered, the configuration CGI module 170 reads/writes the information to the configuration interface module 135, which in turn reads/writes the data to the flash memory 100.

Although the present example makes use of HTML, XML, and JAVA to define web page interfaces and/or reports, it is not the intention of the inventors to restrict such interfaces and/or reports to a web base format or to use a particular language to generate the web pages. A person skilled in the art will recognize that other formats for the reports are possible and that other languages or tools may be used to generate them.

It should be apparent to one skilled in the art that the placing of the input connectors 45 and/or output connectors 70, serial ports 60, network ports 80, engine 140, drivers 150, database system 140, reporter module 145, configuration interface module 135, and web server 165 has a positive cumulative effect on reliability and use of network 25 resources. All user configuration entries and displays, as well as report generation, are handled on-board via the web server 165, including the reports CGI module 155 and configuration CGI module 170, and reporter module 160. On-board storage of machine 15 report data is handled by the database system 145, comprised of the database manager 175 and database 180. All required hardware capabilities for processing for inputs and outputs, as well as serial and network communications are also located within the MMD 20. For all of these functions, the MMD 20 constitutes a self-contained unit and acts as a server to the CDs 35 over the network 25 for, thereby eliminating the need for a central server elsewhere and increasing reliability. Since almost all MMD 20 data processing and interface generation is also handled within the MMD 20, network 25 traffic is also reduced.

Figure 4:
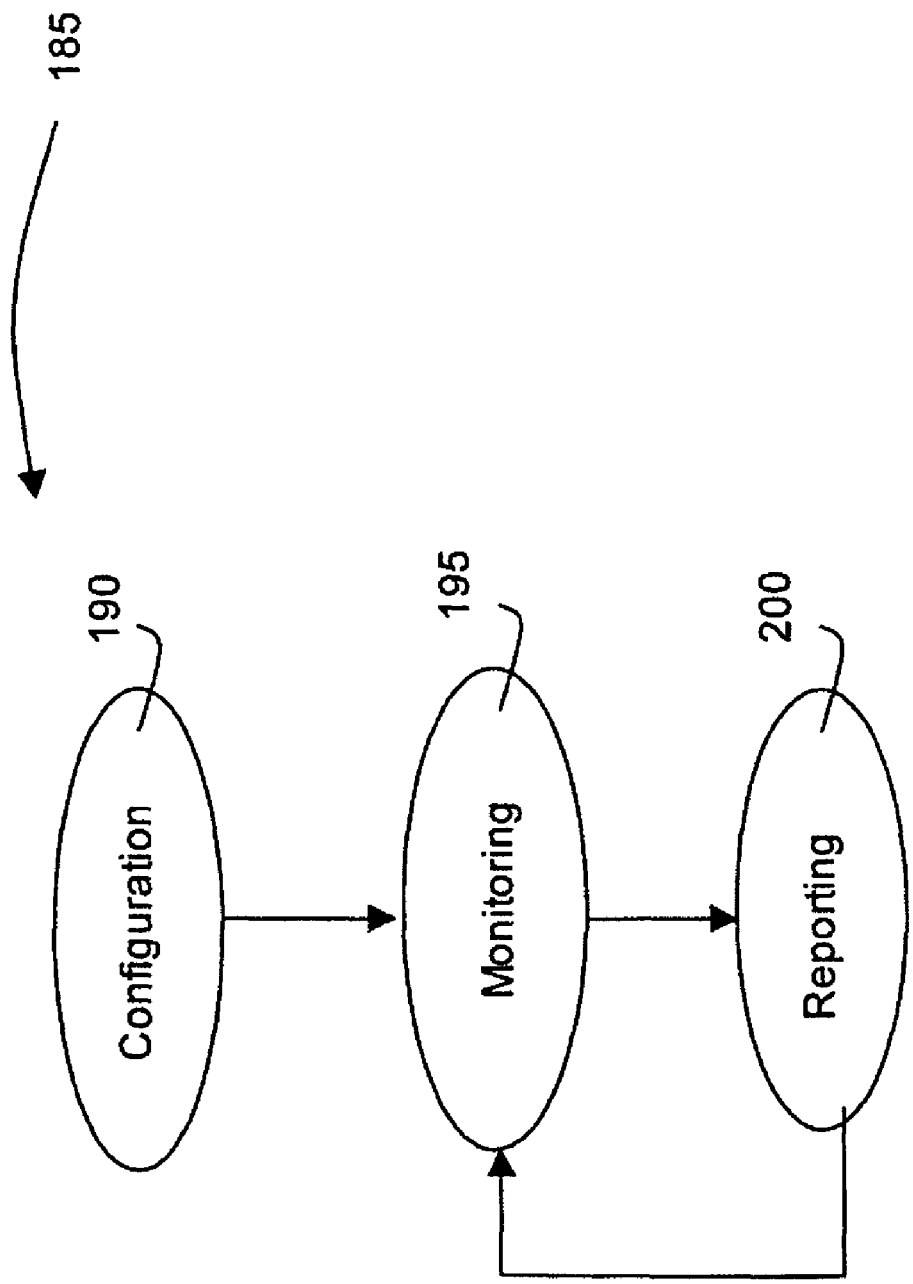
FIG. 4 is a flowchart of a method for using the system of FIG. 1.

FIG. 4 is a flowchart of a method for using the system, shown generally as 185. Beginning at the configuration step 190, the MMD 20 is configured by the user. This includes connecting the machine 15 to the MMD 20 and configuring reports, variables, network ports 80 and connections, serial communications via serial ports 60, machine 15 inputs via input connectors 45 and MMD 20 output signals via output connectors 70. At the end of this step 165, required configuration information is transmitted to the software modules. The MMD 20 software modules are then initialized with the configuration information. Next, at the monitoring step 195, the MMD 20 monitors the machine 15. During this step 195, the engine 140 monitors and transforms the machine's 15 inputs, provides engine 140 outputs as configured, and sends necessary information as report variable changes to the database system 145. Next, at the reporting step 200, the MMD 20 generates reports as requested by the user and transmits them to the user via a user interface generated by the web server 165 and displayed on the user's CD 35. The MMD 20 also generates reports automatically, via the reporter module 160, at given intervals and formats, as configured, and sends the reports to a CD 35 via the network 25 for archiving or processing by other applications. It should be noted that the monitoring step 195 is ongoing and is constantly repeated, even while reports are being generated automatically and requested by the user during the reporting step 200. Thus the monitoring step 195 and reporting step 200 constitute an ongoing cycle that continues until the MMD 20 is disabled, not shown, or there is a change in MMD 20 configuration, not shown.

Figure 5:
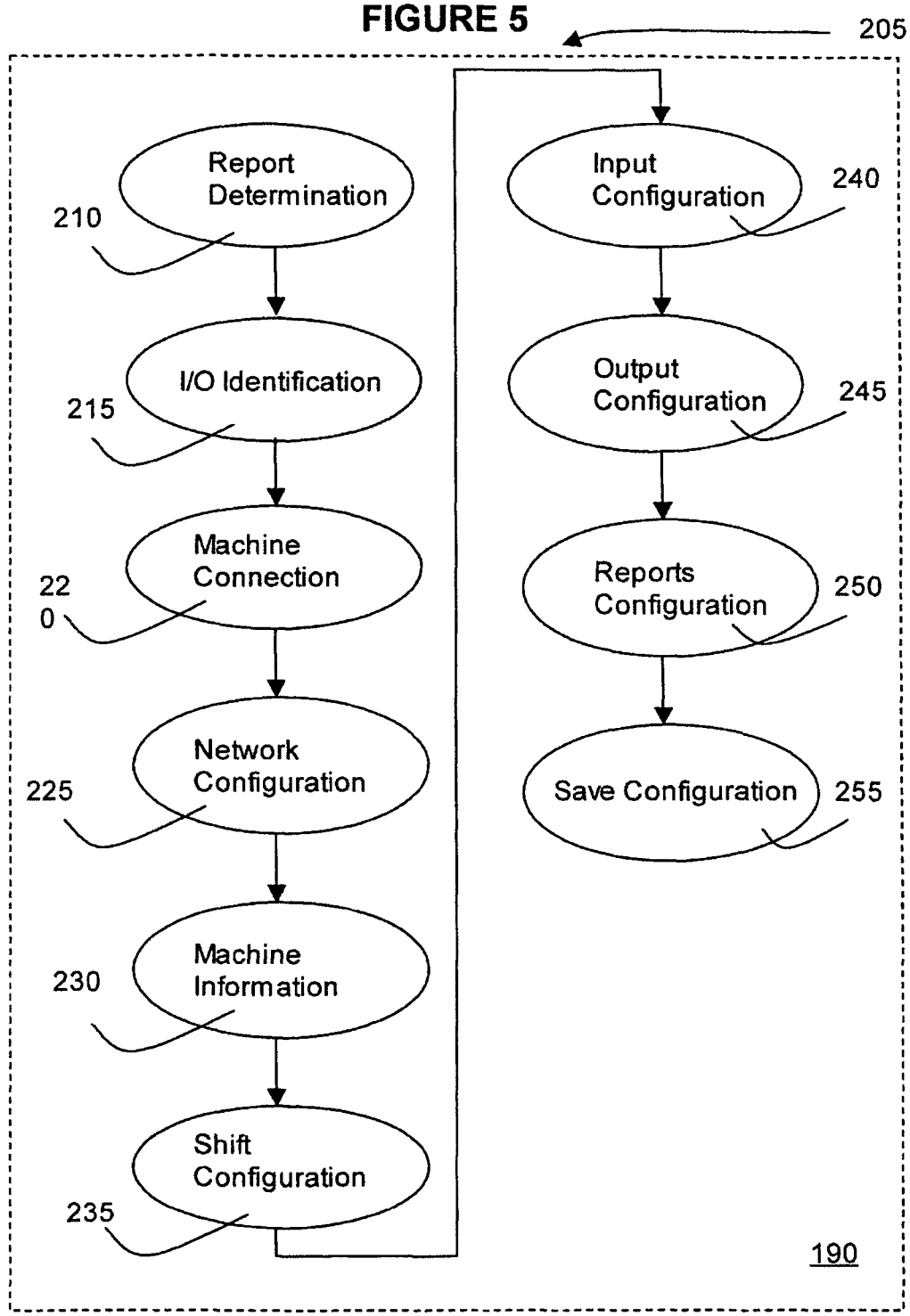
FIG. 5 is a flowchart of the MMD configuration step of FIG. 4.

Reference is now made to FIG. 5, a flowchart of the MMD configuration 190 of FIG. 4, shown generally as 205. Beginning with the report determination step 210, the user determines what type of reports the user desires and the information required for such reports. Examples of reports include: machine status reports, signal reports, maintenance reports, product count reports, and alarms.

Machine status reports monitor the time the machine 15 is in a given state. For example, the report might show the relative times that the machine 15 has been running, cutting, undergoing maintenance, idle, off, etc. Machine status reports can be cumulative or chronological. A cumulative machine status report may provide a pie chart that shows the proportions of the time interval during which the machine 10 was in each state. For a chronological machine status report, a bar chart may be used to illustrate which states the machine 10 was in at each moment over a given interval of time. Machine status reports require that the user determine which states the user wants to monitor.

Signal reports plot information over time, such as temperature, vibration, spindle load, and cabinet humidity. These reports thus allow users to see trends in the signal but also what is occurring in real time. The user can also define limits which can be displayed on the chart and the user can choose to have the engine 140 generate alarms and/or send e-mails as the limits are approached or surpassed. This report requires that the user determine the information to be monitored, applicable limits, and actions to be taken as limits are approached or surpassed.

Maintenance reports determine whether fault information is available from the machine 15 (via the RS232/RS485 serial ports 65) and to track fault information. Faults can be recorded with a start and end time along with their duration. The reports can be cumulative maintenance reports, which display bar charts for the length of each fault. The reports can also be chronological maintenance reports which show the status of each fault type over a given period of time. Finally, maintenance reports can also be preventative maintenance meter type reports. These reports allow a user to work with an input like a car does with its odometer. The user can reset the meter at any time and let it keep track of the input for a predefined time interval. Maintenance reports require that a user identify the type of fault to be monitored as well as the desired time intervals.

A product count report displays a bar chart that shows production count, such as number of units produced by a machine 15, over the course of a shift or number of shifts. Usually a digital signal is used to determine a completed cycle and a factor is used by the engine to determine how many parts were produced from that cycle. However, with serially input data using a serial RS232/RS485 port 65, a user can gather batch and part numbers to reference identification information with the part count data for example, by inputting information with bar code scanner xx. The user must identify the desired information and time intervals required for this report. A product count report may also include some information regarding the number of faulty parts produced. This information may be entered by a machine operator using bar code scanner xx and a sheet of bar codes identifying various types of product faults.

Alarms can be based on any signal, real or derived. Alarms can be emails generated by the engine 140 and sent to a CD 35. The engine 140 can also allow for a delay so that the same alert can be escalated to multiple people within an organization. The user must identify the events for which they wish to have an e-mail notification generated, to which e-mail address the notification should be directed and what the time delay should be applied before sending the e-mail (time delay relative to when the alarm occurred). Multiple email notifications can be configured with different time delays and different recipients for the same alarm. Thus, an e-mail notification can be sent, as an e-mail notification escalation, to increasing numbers of people at increasing levels of authority as time goes on if the condition that has caused the e-mail notification for an alarm to be generated is not corrected.

Next, at the input/output identification step 215, the user must identify the inputs required to capture the information required for the reports. Thus, for each report desired, the user must determine which inputs and outputs are necessary to generate or provide the information required for the report and the signals required to provide such inputs and outputs. These will determine which combinations of digital input connectors 50, analog input connectors 55, digital output connectors 75, and serial RS232/RS485 ports 65 are necessary. The signals available will vary by type of machine 15. From an input perspective, a combination of digital signals may be used to derive the desired information or machine state. Analog inputs also may be combined with digital inputs to provide additional information. For example, an analog voltage input may be used to indicate when the machine 15 is cutting versus whether the machine 15 is simply running or not, as might be indicated by a digital input. As for outputs, the user will have to decide which output connectors 70 to a machine 15, or serial RS232/RS248 ports 65, or Ethernet port 85 may be used to provide the required MMD output signals.

Next, at the machine connection step 220, the user connects the appropriate outputs from the machine 15 to the corresponding digital input connectors 50, analog input connectors 55, and serial RS232/RS485 ports 65 on the MMD 20 to provide the inputs required. For example, digital outputs from the machine are connected to digital input connectors 50 on the MMD 20, analog outputs are connected to analog input connectors 55 on the MMD 20. Serial connections from the machine are connected to the serial RS232/RS485 ports 65 to provide serial inputs and outputs. As well, any additional digital, analog or serial inputs can be added to bring data into the MMD 20. Digital outputs to the machine 15 are ensured by connecting digital output connectors 75 from the MMD 20 to digital inputs on the machine 15 or machine lights such as LEDs. The user may also connect an Ethernet-enabled machine 15 to the Ethernet port 85 to provide inputs at this time. However, preferably, such a machine will be connected to the network 25, over which the machine 25 will communicate with the MMD 20.

Moving now to the network configuration step 225, the user may connect a CD 35 directly to the MMD 20 to configure the Internet Protocol (IP) settings by which the MMD 20 will communicate with the network 25. A network configuration utility allows the user to set parameters for the IP address, the domain name server (DNS) address, the gateway address, the subnet address information, and whether Dynamic Host Configuration Protocol (DHCP) services are available. After the IP configuration information has been entered, the user may connect the MMD 20 to the network 25 via the Ethernet port 85 which will allow the user to continue configuration via a web page user interface from any CD 35 on the network 25 or from a CD 35 directly connected to the MMD 20. To do so, the user enters the IP address of the MMD 20 device from any web browser enabled CD 35. The web server 165 then generates an initial web page interface containing a menu of configuration and reports options and transmits it to the CD 35. From this web page interface, the user selects the configuration option. This causes a configuration web page user interface to be generated by the configuration CGI module 170. From the configuration web page interface, the user then selects the desired configuration items, which causes the configuration CGI module 170 to generate additional pages for entering or viewing the appropriate configuration information.

For example, if a user wishes to configure inputs, the user first selects configuration from the initial web page user interface menu, which causes the configuration CGI module 170 to generate the configuration web page user interface containing the configuration options. From this page, the user then selects the option for configuration of inputs. This causes the configuration CGI module 170 to generate another web page containing the necessary fields into which the user may enter the information necessary for configuring the input. This information is transmitted back to the configuration CGI module 170 which processes the configuration information entered and transmits it the configuration interface module 135 which, in turn, stores it in the flash memory 100 and transmits it to the appropriate modules.

Proceeding now to the machine information step 230, the user enters basic machine 15 and MMD 20 information via one or more web pages user interfaces generated for this purpose by the configuration CGI module 170. This information includes, among other things: a device name to associate the MMD 20 with the machine 15 to which it is connected, system user names and corresponding passwords, whether the user desires that digital signals for alarms be inverted, IP address information if not already provided, and the IP address of a time server for providing time information. If desired, the user may also choose to import or export configuration information to/or from a file on the user's CD 35.

Moving next to the shift configuration step 235, the user defines the shifts that are used in the reports generated by the reports CGI module 155 and reporter module 160. The shifts are used to determine default time intervals for reporting purposes and refer to the period between a scheduled start and end time for workers or machines 15. Relevant shift information is eventually forwarded to the reports CGI module 155 and reporter module 160. To configure shifts, the user selects the shift configuration option from the configuration web page user interface. This causes a shift configuration web page user interface to be generated by the configuration CGI module 170. The user then enters information into the shift configuration web page user interface to assign a name to each shift, define the time intervals applicable to the shift, and assign a color to be used to represent the shift in reports that display graphical representations of machine data for the shift.

Moving now to the input configuration step 240, the user enters the configuration information for the inputs identified during the input and output identification step 215. For each input from the machine 15, the user enters a variable name and any transformations to be performed by the engine 140. For each input, the user also enters the associated MMD 20 digital input connector 50, MMD 20 analog input connector 55, IP address for machines 15 providing Ethernet inputs, or MMD serial RS232/RS 285 port 65. For example, for digital inputs, users may choose to flatten or invert the digital signal. For analog inputs, it is often desirable to specify a scaling method for the analog signal. For serial inputs, such as data received from bar code readers, it may be desirable to specify a bit mask. The variable names and the operations to be effected are eventually forwarded to the engine 140 for use in handling the inputs. This information is entered and viewed via web page user interfaces created by the configuration CGI module 170.

Next, during the output configuration step 245, MMD outputs and output variables are configured. These may include the generation of MMD 20 output signals which are transmitted by the engine 140 via the output connectors 70. During this step, the user selects an output configuration option from the menu item on the configuration web page user interface. This causes the configuration CGI module 170 to generate an output configuration web page user interface. Using this interface, the user defines additional transformations which are to be effected by the engine 140 on the variables assigned to inputs in the input configuration step 240. The result of such a definition is a new variable which can, if desired, be used as an input for another transformation defined during this phase of configuration. Thus, the user continually adds transformations and creates new variables until the user has defined variables that represent the information necessary for report variables. All of the variables and operations are eventually forwarded to the engine 140 which, once the MMD 20 is configured and operating, carries out the desired transformations on the variables and sends the resulting report variable to the database manager 175. Once the variables are established, the user may also choose to have any or all of them, including report variables, forwarded on to an Object Link Embedding for Process Control (OPC) server automatically for another application to access. For example, if a user desired that a digital input, input A, be inverted and compared for logical equivalence with another digital input, input B, the user would first define the variable names for each input during the input configuration step 240 and would also specify that the value of input A was to be inverted. Then, during the output configuration step 245, the user would specify that the value of input A is to be compared to the value of input B for logical equivalence and that the result be stored in another variable. The user could then define another transformation using the variable containing the result of the logical equivalence comparison. The result of this last transformation would be stored in still another variable defined by the user and associated with this last transformation.

It is during the output configuration step 245 that the IP address of any MMD 20 designated to monitor the status of other MMDs 20 is entered. If such an address is entered and the user activates this monitoring feature, then, during initialization, the MMD 20 will send machine status information (such as whether the machine is running or not) and the MMDs 20 IP address to the designated MMD 20. Monitored MMDs 20 will only transmit new machine status information to the designated MMD if there is a change in status. This information is used by the web server 165 of the designated MMD 20 node to allow the user to navigate from MMD 20 to MMD 20 in a list, such as a hierarchal tree, and view the reports and basic machine running status of each MMD 20.

Proceeding now to the reports configuration step 250, the user defines and configures the reports. From the configuration web page user interface, the user selects the reports configuration option. This causes the configuration CGI module 170 to generate a web page menu of all the different report types. From this menu, the user selects the desired report type and the configuration CGI module 170 generates a web page user interface for entering and viewing the configuration information for a report of the selected type. The user then enters the required information for generating the report. This information includes the variable names to be used as the values displayed in the report. These are the variables that are stored in the database 180. Additional information, such as color information for graphs displayed in reports and labels for fields may also be entered. The user repeats this process for all reports desired.

For certain reports and values, the user may specify whether the engine 140 should send e-mail notifications, as well as the recipients, frequency, and delays of such notifications. The user may also choose to have all reports automatically forwarded by the reporter module 160 to a CD on the network for archiving or use by another application.

The report variable names, report types, and structures to be stored in the database are eventually forwarded, via the configuration interface module 135, to the database manager 175 which creates a table for each report. Variables names to be monitored for e-mail notifications, as well as notification parameters, are forwarded to the engine 140. Report types and required information, such as variable names required and shift, time interval or color information, are forwarded to the reports CGI module 155 and, if the user has opted to have the reporter module 160 automatically forward reports in CSV or Microsoft Excel format to a CD 35 on the network 25 at given intervals, to the reporter module 160 as well.

Moving now to the save configuration step 255, the user may elect to save configuration information to the flash memory 100. If the user so chooses, the configuration CGI module 170 transmits the configuration information to the configuration interface module 135 which writes the information to the flash memory 100. The configuration interface module 135 may then access the configuration information in the flash memory 100 and forward the appropriate configuration information to the other modules. The user may subsequently alter the configuration by again choosing the configuration option from the initial web page generated when the MMDs 20 IP address is entered on the user's CD 35, The above configuration procedure is provided as an example. It is not the intention of the inventors to limit the configuration procedure to the order specified above. It will be apparent to one skilled in the art that the order and content of some steps may be modified.

Figure 6:
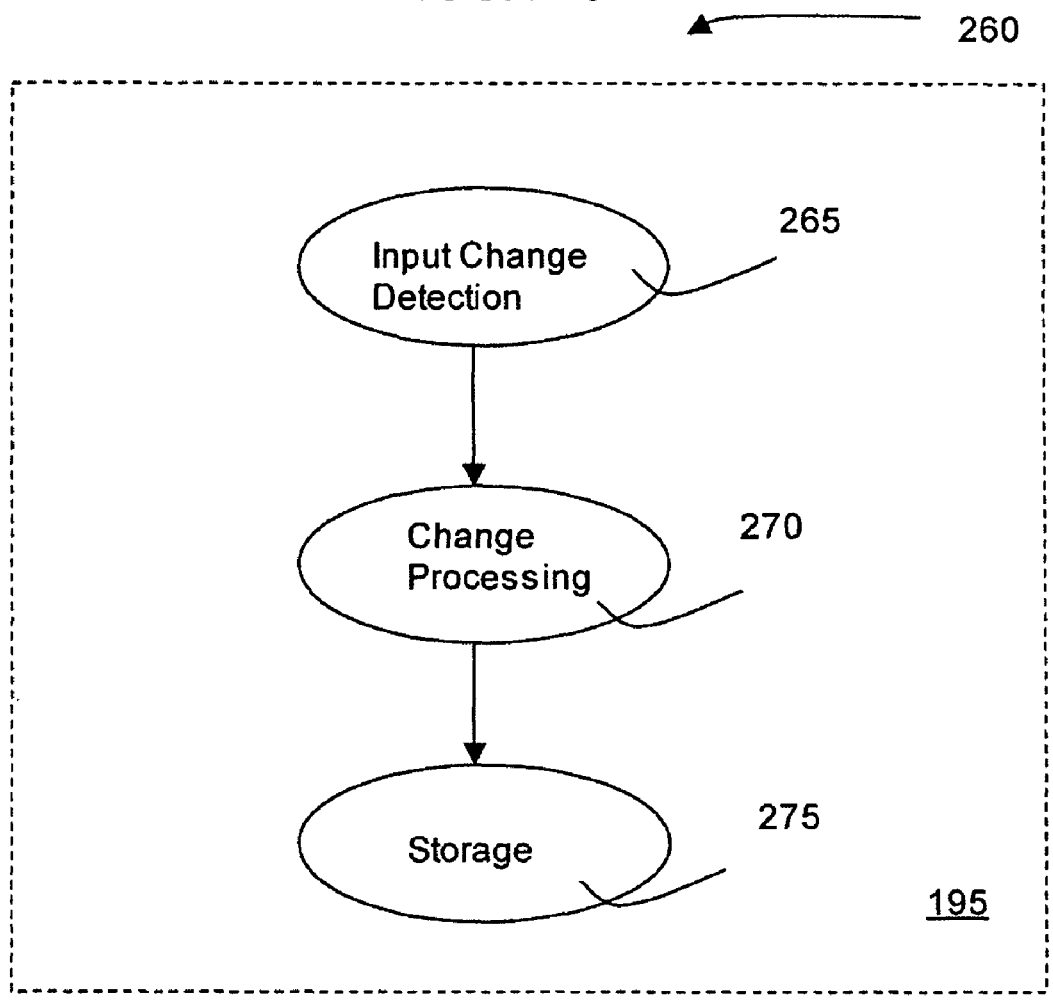
FIG. 6 is a flowchart of the monitoring step of FIG. 4.

Reference is now made to FIG. 6, a flowchart, shown generally as 260, of the monitoring step 195 of FIG. 4. Beginning with the input change detection step 265, the engine 140 automatically monitors the machine 15 for input changes via the drivers 150. The engine 140 may also issue MMD 20 output signals and e-mail notifications during this step 265. For example, the engine 140 may be configured to issue an MMD 20 output signal or e-mail notification after the machine 15 has been in a certain state for 15 seconds. Thus, the state of the input will not have changed when MMD 20 output signal or e-mail notification is triggered. Next, at the change processing step 270, the engine 140 processes any detected input change by effecting transformations on the input change, which may result in changes to the values of report variables, and issues any MMD 20 output signals or email notifications required as a result of the transformations. The transformations undertaken are based on the configuration information. Finally, at the storage step 275, changes in the values of report variables are forwarded to the database manager 175 'which stores them in the appropriate format and table of the database 180, based on the MMD 15 configuration information.

Figure 7:
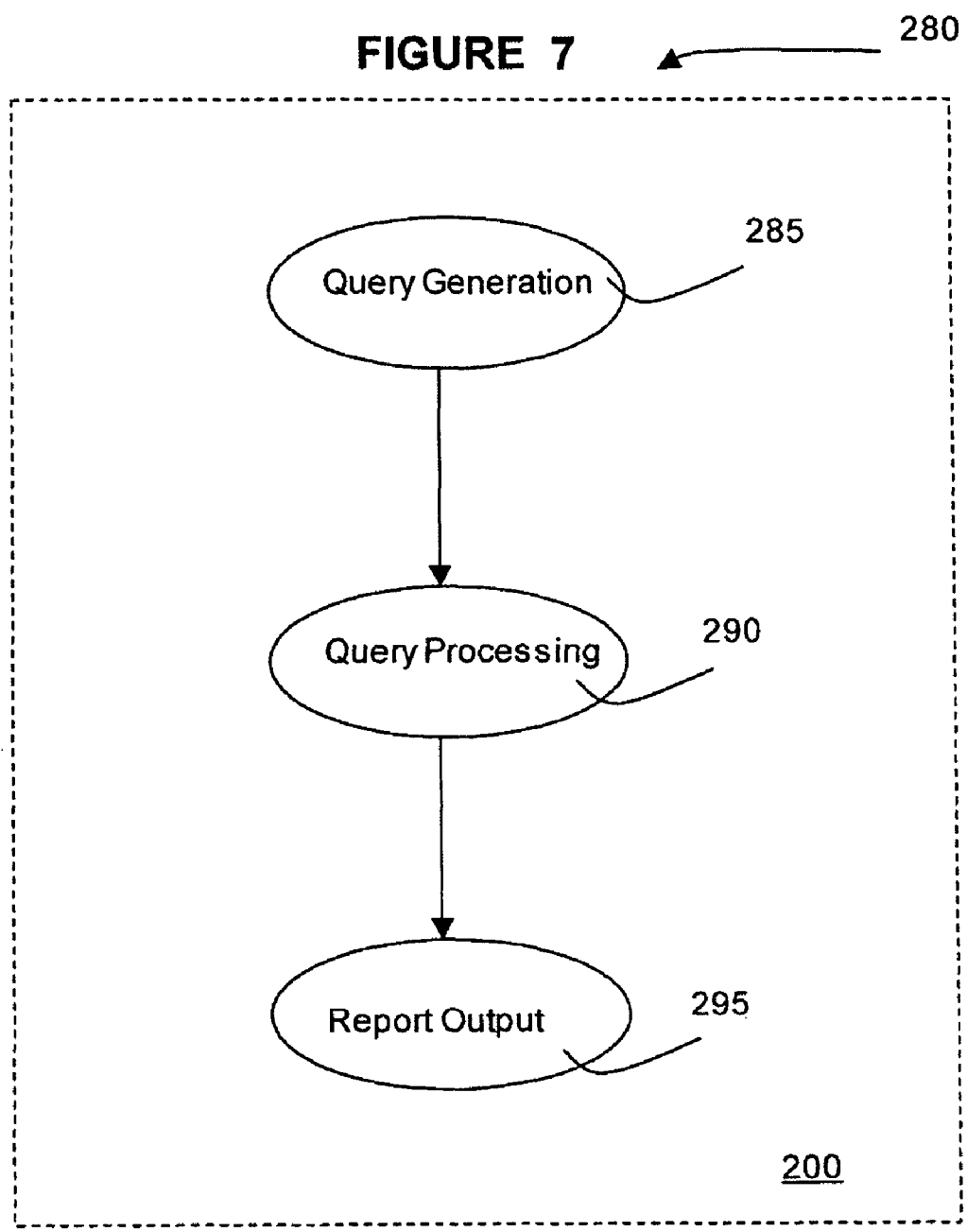
FIG. 7 is a flowchart of the reporting step of FIG. 4 for automated reports.

Reference is now made to FIG. 7, a flowchart of the reporting step 200. of FIG. 4 for automated reports. This flowchart is shown generally as 280. The MMD 20 may automatically generate reports at certain time intervals, depending on whether this option is chosen during the configuration step 190. Beginning with the query generation step 285, the reporter module 160 generates an SQL query and transmits it to the database manager 175. Next, at the query processing step 290, the database manager 175 executes the query by interrogating the database 180 and transmits the result back to the reporter module 160. Finally, at the report output step 295, the reporter module 160 receives the query results, transforms them into one or more reports the format specified in the configuration information, and transmits the report over the network 25 to a CD 35. The report may be stored on the CD 35 for archival purposes and/or used by the user or other applications, such as factory/plant automation software.

Figure 8:
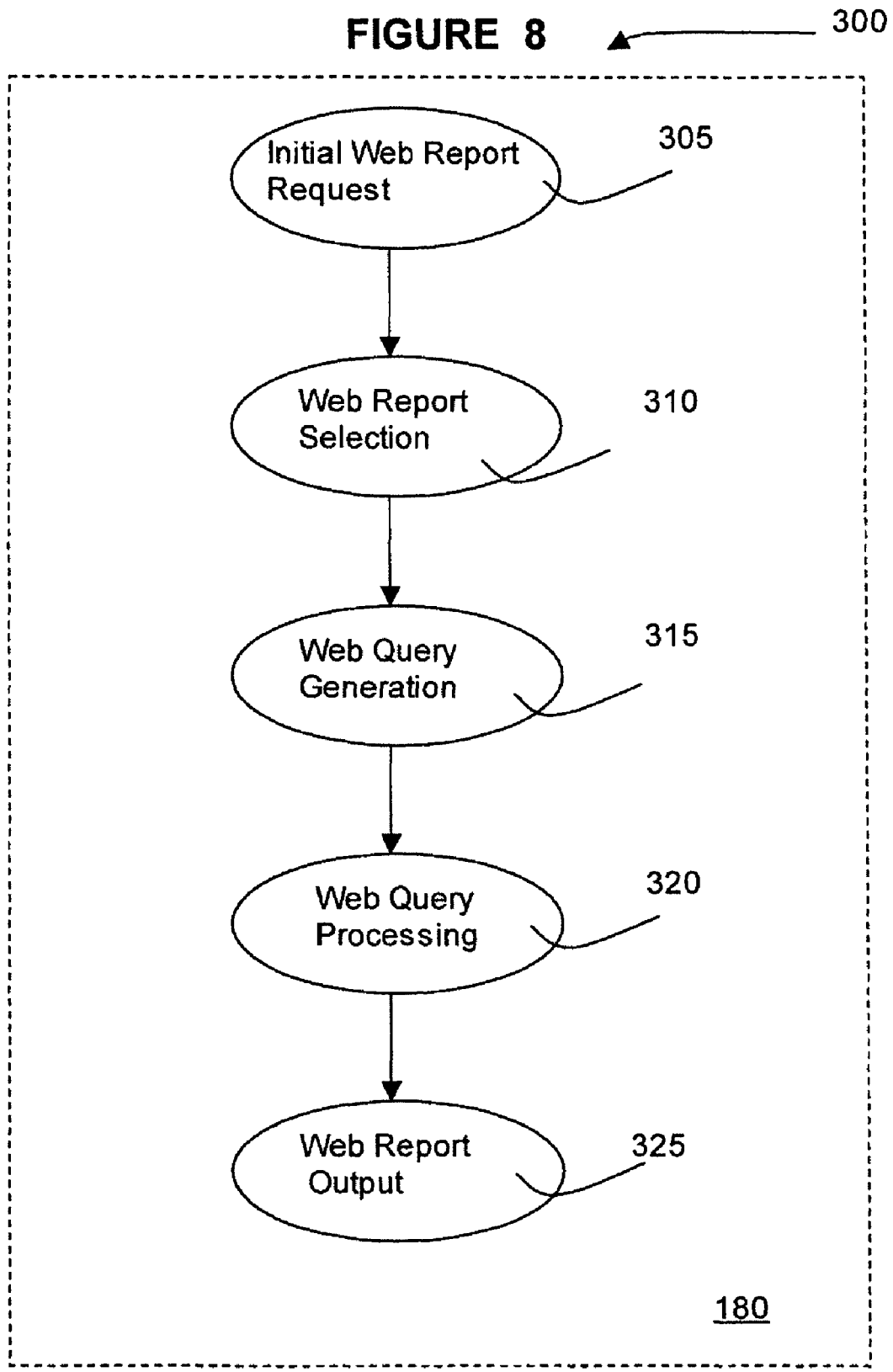
FIG. 8 is a flowchart of the reporting step of FIG. 4 for user requested web page reports.

FIG. 8 is a flowchart of the reporting step 200 of FIG. 4 for user requested web page reports, shown generally as 300. Beginning with the web report request step 305, the user enters the IP address of the MMD 20 attached to the machine 15 the user wishes to view. The web server 165 then generates an initial web page user interface menu from which the user may choose to view reports or enter or view configuration information. The user selects the option to view reports and the reports CGI interface 205 generates a report selection web page user interface from which the user may choose a report to view. Next, at the web report selection step 310, the user selects a report from the web page report selection user interface menu. If the report selected requires that the user enter parameters for generating the report, the reports CGI module 155 generates a web page user interface for the desired report from which the user enters the required parameters. If, however, the report does not require entry of use parameters, or if default values for the report were specified during configuration, the parameter entry web page user interface will not be displayed and the reporting step will automatically to the next step. These scenarios are not shown in FIG. 8. Next, at the web query generation step 315, the reports CGI module 155 generates an SQL query which is sent to the database manager 175. This query incorporates any parameters entered by the user during the web report selection step 310. Next, at the web query processing step 335, the database manager 175 executes the query to obtain the desired information from the database 180 and transmits the results to the reports CGI module 205. Finally, at the web report output step 325, the reports CGI module 155 uses the information returned by the database manager 175 to generate a web page containing the report which is transmitted to the user's CD 35.

The reports CGI module 155 can constantly repeat the web query generation step 315, the web query processing step 320, and the web report output step 325 to capture and report changes in inputs and variables, as handled by the engine 140 and database manager 175. This allows the user to see the changes as they occur in real time. Also, as mentioned above, the user may specify during configuration that the reports CGI module 155 generate a series of default reports, using default parameters, that will appear as soon as the user types in the IP address of the MMD 20. In this scenario, not shown in FIG. 9, the web query generation step 330, the web query processing step 335, and the web report output step 340 are automatically undertaken for the default reports and parameters as soon as the MMDs 20 IP address is entered. The result is that the initial web page user interface menu generated by the web server 165 will display the default reports, generated by the reports CGI module 155 with default parameters, along with the menu of available reports and configuration options. Any reports subsequently chosen from the reports menu which also have default parameters specified will also be automatically generated by the reports CGI module 155 with these parameters when selected. The user then has only to enter specific parameters for reports where there are no default parameters or when the user wishes to use different parameters.

If the MMD 20 for which the IP address is entered during the web report request step 320 is designated to monitor other MMD devices, the web server 165 of that MMD 15 node will generate an initial web page user interface menu having a frame containing a list, for example a hierarchal tree, from which a user may select different MMDs 20 accessible from the designated MMD 20 for report viewing. Each entry in the list will be associated with IP address of the associated MMD and the MMDs machine status information. Actual reports will be displayed in another frame allocated to that effect. If the user desires, the machine status of each machine 15 attached to an MMD 20 can be obtained by moving a mouse pointer device over the name of the MMD 20 attached to the device on the list of MMDs. When a user selects a MMD 20, a reports request is sent to the MMD 20 selected as if the user had entered the IP address of the selected MMD 20. Subsequently, the request is handled by the selected MMDs 20 web server 165 and reports CGI module 155 as described above and shown in FIG. 8, except that all of the web report pages and menus generated are shown within the frame allocated for report viewing. The user may then navigate to another MMD 20 to view its reports by clicking on the node within the frame containing the list of MMDs. In this fashion, the user may view the reports available from a variety of MMDs 20 in succession without being obligated to type in the IP address of each successive MMD 20.

Having described the general environment, including the MMDs 20 and machines 15, the following description relates to a system and method for verifying identity during data entry with a barcode scanner according to exemplary embodiments of the invention.

Figure 9:
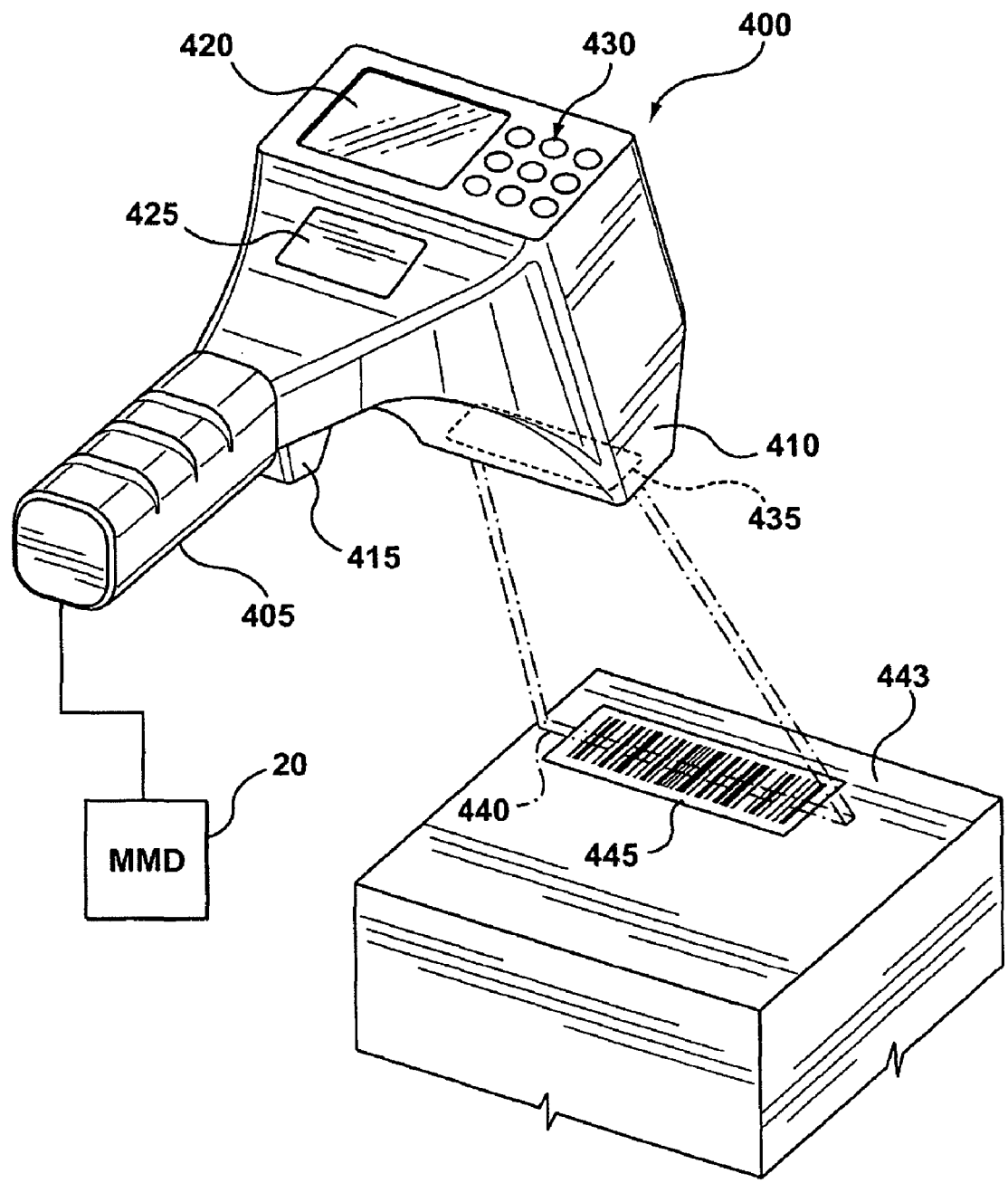
FIG. 9 shows an exemplary embodiment of a system for verifying identity according to an embodiment of the invention.

FIG. 9 shows a handheld barcode scanner 400 that is in communication with an MMD 20 (shown as a block in FIG. 9). In practice, the barcode scanner 400 may be connected directly to the MMD 20 or may be connected to the machine 15 and data from the barcode scanner 400 will flow through the machine 15 to the MMD 20.

In this exemplary embodiment, the barcode scanner 400 has a handle portion 405, a scanning portion 410, a trigger 415, a display screen 420, a fingerprint reader 425, and a keypad 430. As shown in FIG. 9, the barcode scanner 400 is arranged such that the handle portion 405 is connected to the scanning portion 410 to form an "L"-shape with a scanning element 435 positioned within the scanning portion 410 to generally project a scanline 440 out of one of the ends of the "L"-shape. The trigger 415 is positioned at the interior angle of the "L"-shape such that an operator holding the handle portion 405 will be able to point the scanning element 435 at an object and pull the trigger 415 with a digit, for example an index finger or middle finger. Further, the fingerprint reader 425 is positioned on the opposite side of the trigger 415 such that an operator holding the handle portion 405 can place a digit (for example, a thumb or index finger) on the fingerprint reader 425 at the same time as having a digit on the trigger 415. The display screen 420 and the keypad 430 are arranged generally adjacent to the fingerprint reader 425 for viewing when the scanning portion 410 is facing toward a barcode to be scanned.

It will be understood by one of skill in the art that other configurations are also possible. Other configurations may include less complex arrangements in which elements such as the trigger 415, display screen 420 and the keypad 430 are not included. For example, the barcode scanner may be wand or pen-shaped and have a scanning element 435 that is passed over a barcode in a sweeping motion by an operator to read the barcode. Other configurations may also include other input/output devices, such as a speaker for audibly indicating when a barcode has been scanned or the like. Preferable configurations are those in which an operator can comfortably hold the barcode scanner while placing a digit on the fingerprint reader 425. In cases where an activator, such as trigger 415, is provided, it is preferable that the operator can comfortably hold the barcode scanner while simultaneously placing a digit on the fingerprint reader 425 and operating the activator, for example, with another digit. In some cases, it may be possible to incorporate the fingerprint reader 425 into the activator itself.

FIG. 9 also shows an object 443 that includes a barcode 445 to be scanned. The scanline 440 from the barcode scanner 400 is shown scanning the barcode 445. The object 443 may be, for example, a shipping box, product, list of error codes or the like, as is known in the art. The various systems and methods used by barcode scanners to scan and read barcodes are well known in the art.

Figure 10:
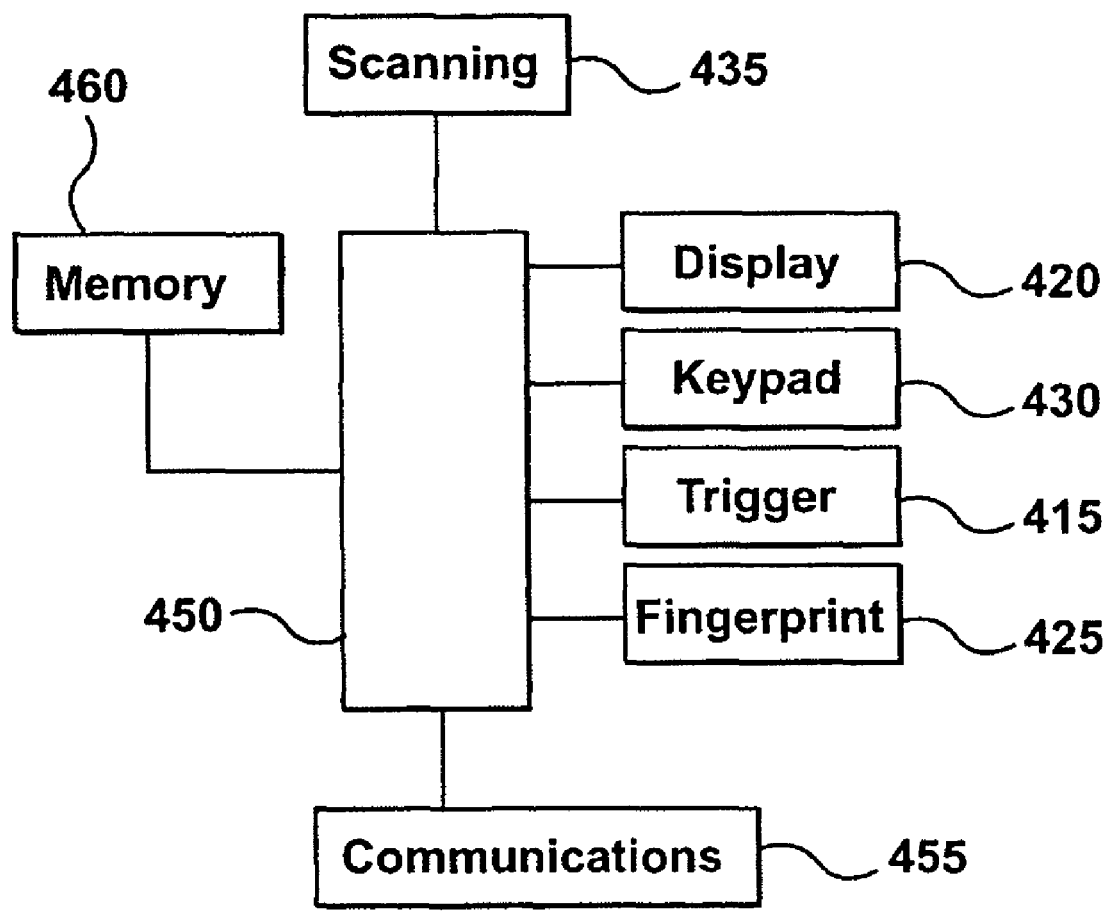
FIG. 10 shows a functional block diagram of a barcode scanner of the system of FIG. 10.

FIG. 10 shows a schematic block diagram illustrating the barcode scanner 400 and illustrates some of the elements/functions therein. The barcode scanner 400 includes a controller 450 that is connected to the trigger 415, the display 420, the fingerprint reader 425, the keypad 430 and the scanning element 435. The controller 450 is also connected to a communications subsystem 455, for communication with the MMD 20, and with a memory 460 for storing data, for example, data related to the fingerprint of the operator or a recently scanned barcode or the like.

The scanning element 435 may be a commercially available scanning element as is known or developed in the art. It will be understood that the specific method of scanning and interpretation of the barcode data may be any method now known or hereafter developed.

The fingerprint reader 425 may be a commercially available fingerprint reader using a known or hereafter developed fingerprint identification algorithm. The specific method of reading the fingerprint, whether laser, pressure, or the like, is not critical to the current embodiments. Similarly, the method of storing fingerprints in a database and the methods of comparing a read fingerprint with those in a database are known in the art and are not described in detail herein.

The trigger 415, display screen 420 and the keypad 430 may also be selected from various standard components such as those known in the art. For example, the display screen may be an LCD display having an appropriate size and resolution. Various alternative embodiments are also possible, for example, the display screen 420 may be substituted by LED indicators that are turned on or off to indicate various conditions. Further, the trigger 415 and the keypad 430 may be implemented in various other ways such as using a touch-sensitive display screen or the like. It will further be understood that elements such as the trigger 415, display screen 420 and the keypad 430 may be optional in a barcode scanner 400 having a simpler configuration.

The communications subsystem 455 provides communications between the barcode scanner 400 and an MMD 20. These communications may be via a wired or wireless connection. A wired connection may include an RS232/RS285 connection, a USB connection, a Firewire connection, or other wired data connection. A wireless connection may include a Bluetooth™, IEEE 802.11 or other wireless connection.

The controller 450 and memory 460 are also components as will be known to those of skill in the art. For example, the controller may be a programmable logic circuit or a computer processor having an appropriate capability. The degree of complexity of the controller and memory components will be related to the configuration of the barcode scanner 400 as described in further detail below.

Generally speaking, in operation, an operator grips the handle portion 405 of the barcode scanner 400, and places a digit onto the fingerprint reader 425 such that an appropriate area of the digit is in contact with the fingerprint reader 425. The operator then points the scanning portion 410 at a barcode 440, and depresses the trigger 415. In this process, the barcode scanner 400 and MMD 20 operate together to read the fingerprint and the barcode as described in more detail with reference to FIG. 11.

Figure 11:
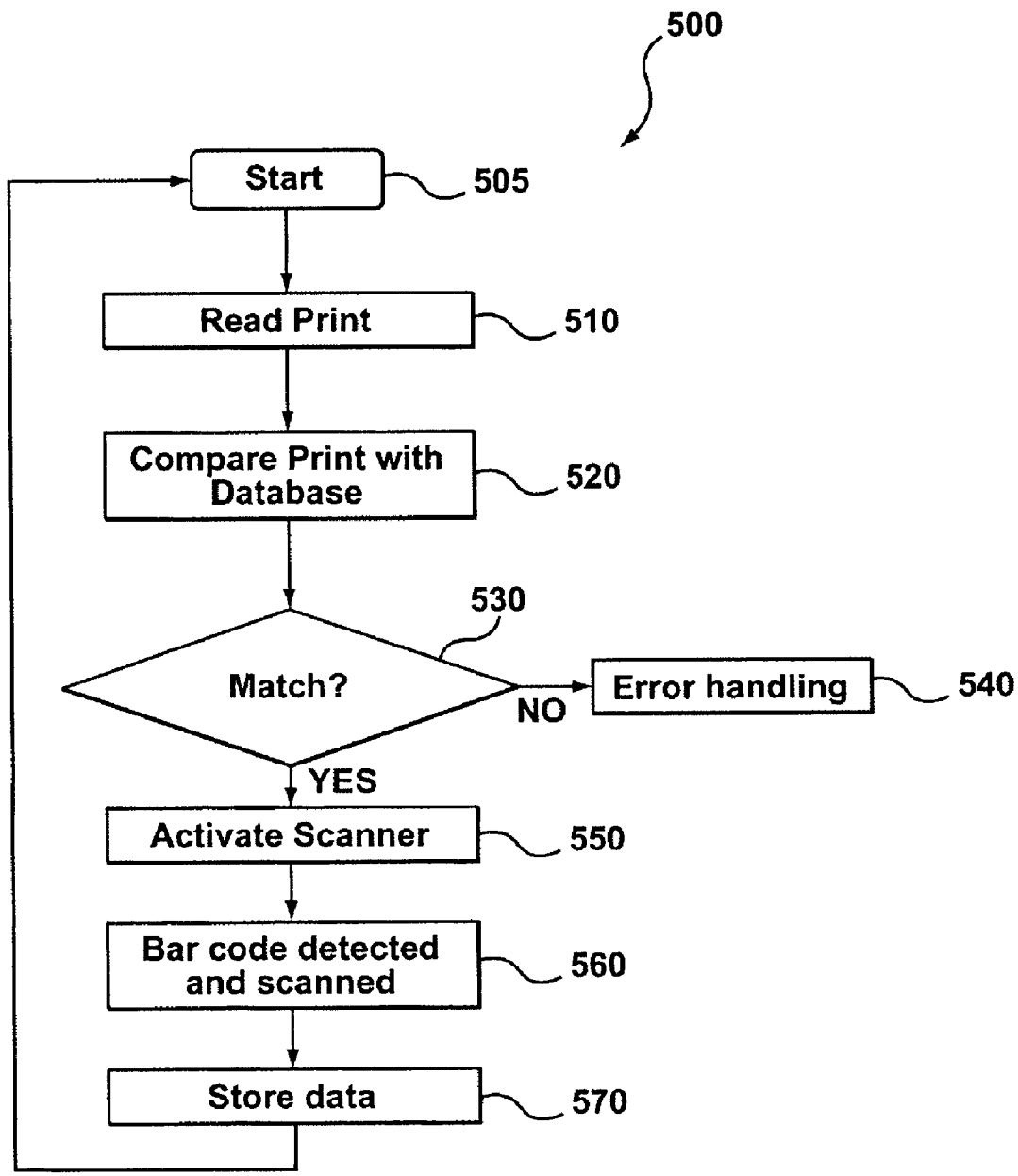
FIG. 11 is a flowchart of an exemplary method according to an embodiment of the invention.

FIG. 11 is a flowchart of a method 500 according to an exemplary embodiment of the invention. The method begins at 505 when the operator or user holds the barcode scanner 400 and places a digit over the fingerprint reader 425 to activate the barcode scanner 400.

At 510, the barcode scanner reads fingerprint data (i.e. some form of data representing the fingerprint, as will be known to one of skill in the art) from the operator's digit. The fingerprint data is stored in buffer memory on the barcode scanner 400 and is transmitted from the barcode scanner 400 to the MMD 20.

At 520, the fingerprint data is compared to an operator database on the MMD 20, for example stored in database 180. It will be understood that the operator database includes identification data related to employees identity (such as an employee number, a name, or the like) and associated fingerprint data. In conducting the comparison, the MMD 20 may first determine if the fingerprint data matches with an employee and then secondly determine if the matched employee is indicated as being authorized to use the barcode scanner 400. In this way, various levels of security may be developed. Depending on the level of security required, there may be certain machines 15 that may be used by any person and, in this case, fingerprint authorization is not necessary. In other cases, some employees may be authorized to use certain machines 15 within a manufacturing environment but not authorized to use other machines 15. In these cases, the fingerprint data comparison and the security level comparison are both required. The level of security for the system or for individual MMDs/machines can be set/changed using, for example, the configuration process described above.

At 530, it is determined whether the fingerprint matches an authorized user in the database.

If there is no match, at 540 the barcode scanner 400 enters an error-handling mode, which is described in more detail below.

If there is a match, then at 550, the system waits for the trigger 415 to be activated. In this embodiment, the trigger 415 is not activated until a digit has been placed on the fingerprint reader 425 and the fingerprint data matches with that of an authorized user. However, it will be understood by one of skill in the art that, in alternate embodiments, the barcode scanner 400 may be configured such that the trigger 415 (or the scanning element 435, in the event there is no trigger 415) could be activated for barcode scanning even before the fingerprint reading and analysis is performed. In this alternate case, the data read by the scanning element 415 may be buffered in memory 460 pending the determination'of whether or not the operator is authorized or whether or not the data is to be recorded without a specific user identification.

At 560, the barcode scanner 400 outputs the scanline 445 and the scan is performed to detect a barcode 445.

At 570, data such as the barcode information scanned, as well as other information such as the data, time, location, and the like are stored in memory on the barcode scanner 400 and the data is transmitted to the MMD. The MMD 20 will then store the operator's identity, the barcode scanned, the date, time, location, and the like of the scan in a database and may perform further processing on the data as described above.

The system then resets and, at 505, waits for an operator to activate the scanner again by placing (or leaving) a digit on the fingerprint reader 425

In this embodiment, the resetting of the checking of the operator's identity at each activation of the barcode scanner 400 ensures that an unauthorized operator does not gain access to the barcode scanner 400 following activation by an authorized operator. In an alternative embodiment, the barcode scanner 400 may be configured to detect when the operator's finger is lifted off of the fingerprint reader. This allows the barcode scanner 400 to be controlled to only check the identity of the operator when the operator's digit is first positioned on the fingerprint reader. In another alternative embodiment, the system may be configured such that an operator's identity is checked during an initial use of the barcode scanner 400 and is then left activated for a predetermined time or predetermined number of scans, or is then left active as long as the time between scans is less than a predetermined amount of time, or the like.

Figure 12:
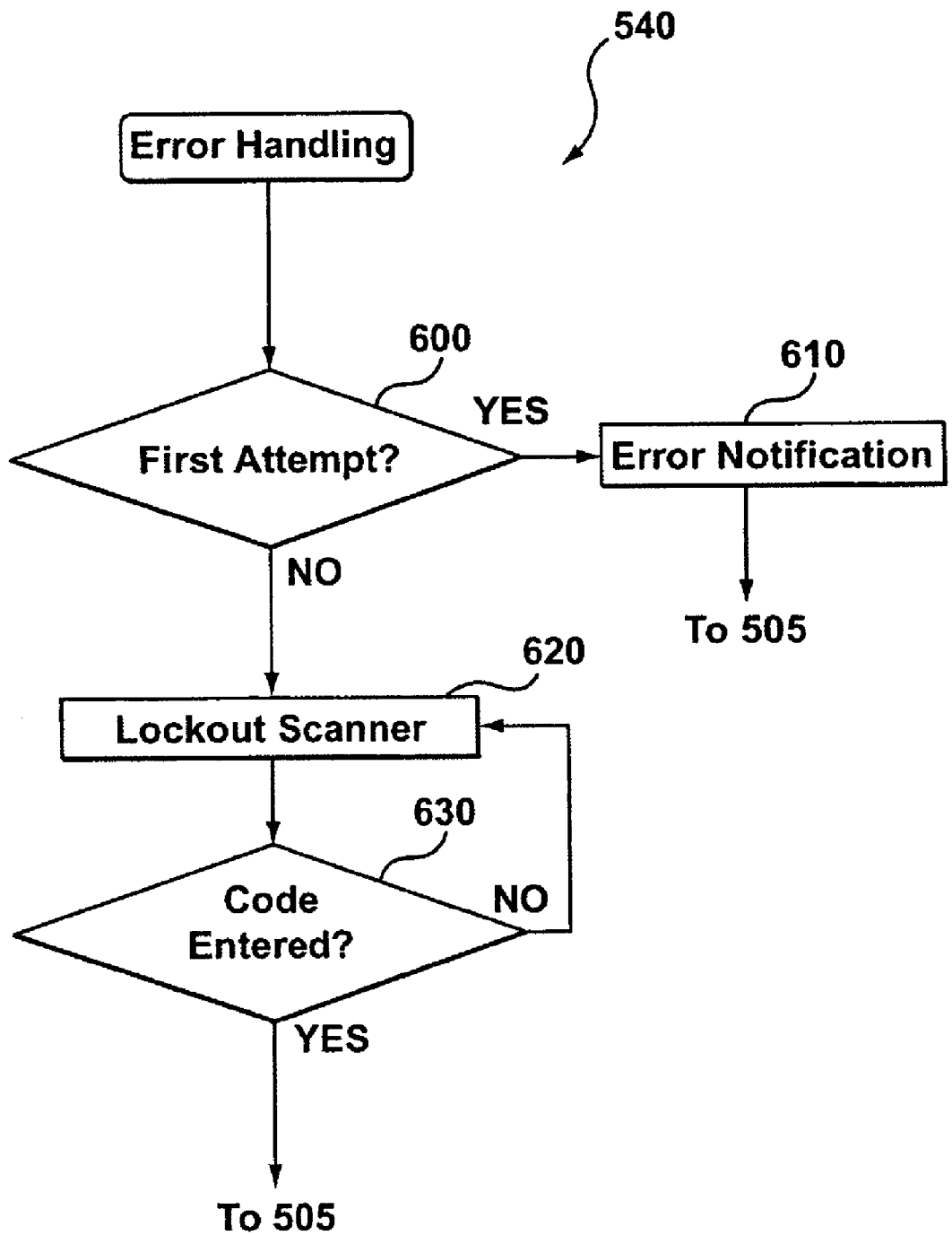
FIG. 12 is a flowchart of an exemplary error handling process of the method of FIG. 11.

The error handling at 540 may take various forms depending on the nature of the environment and security levels within which the barcode scanner 400 is to be used. FIG. 12 shows and exemplary error handling process 540. At an initial stage (600), it is determined if this is the first attempt within a predetermined amount of time. If so, at 610, the display 420 is used to notify the operator that an error has occurred and that the operator should clean the fingerprint reader 425 and/or wipe their finger before replacing the finger on the fingerprint reader 425. Thereafter, the method returns to the main process shown in FIG. 11 at 505. If the current attempt is a second or greater attempt within a predetermined time, at 620 the operator is locked out from using the barcode scanner 400. At 630, the method then waits for entry of a security code and the barcode scanner 400 is not usable again until a supervisor enters the correct security code using the keypad 430. Once the security code is entered, the method returns to the main process of FIG. 11 at 505. It will be understood that the number of attempts before lockout may also be adjusted. Further, there may be more than one security code available for different levels of staff or the like. Still further, in the event that the fingerprint belongs to a known employee who is not authorized to use the barcode scanner 400 (or associated machine 15), the employee may be notified that he/she should seek a supervisor for authorization or the like.

In an alternative error handling process, the operator may be lead to believe that the requested scan has been performed by having the barcode scanner 400 provide the scanline 440, while the barcode scanner 400 sends a silent alarm to a supervisor or security personnel, for example, through the MMD 20, notifying a supervisor that an unauthorized operator is using the barcode scanner 400. Corresponding information such as the date, time, and location as well as the scanned fingerprint can also be stored in the MMD 20 and may be transmitted to the supervisor or the like.

It will be understood by one of skill in the art that the barcode scanner may have varying levels of controller/processor capability and/or memory available. For example, the barcode scanner may have limited processor capability and memory such that data read into the barcode scanner is immediately sent to the MMD for processing. In this case, the barcode scanner may not have a display, keypad or even a trigger (i.e. the barcode scanner may be continuously scanning, as is known in the art). At another level, as is described above, the barcode scanner may have slightly more processing power and memory. In this case, the barcode scanner may temporarily store data in a buffer before sending to the MMD and may also perform some preliminary processing of the fingerprint data that is read. At a more advanced level, the barcode scanner may include sufficient processing power and memory to maintain a fingerprint database and software for comparing read fingerprint data with the fingerprint database. At this level, the barcode scanner provides the elements needed for ID verification within the barcode scanner itself. At a further advanced level, the barcode scanner may include further memory for larger database storage and processor capability, as well as an Ethernet connection or the like, to function more generally as an MMD. In this latter case, the barcode scanner will maintain a local database of all of the data obtained (i.e. operator fingerprint and ID, barcode scanned, date, time, location, etc.) and provide the data to other MMDs or CDs when needed for reporting purposes.

In some embodiments, the barcode scanner 400 may also be used for inputting or editing fingerprint data of operators/users. In this case, a code may be entered through the keypad 430 or through the scanning element 435 indicating that the next fingerprint data is to be stored/updated in the authorized user database. The operator would then place a digit on the fingerprint reader 425 and additional information about the user could be entered through other input devices or the like.

It will also be understood that, depending on the required functionality, the barcode scanner may have two-way communication with the MMD or may only be able to transmit data in one direction, that is, from the scanner to the MMD. In the case of one-way communication, the barcode scanner will not be able to receive information from the MMD such as an indication of whether or not a user is authorized. In this case, information may need to be provided to an operator via another method, such as, for example, an LED or other display screen connected to the MMD, so that the MMD can output when an error in fingerprint reading or barcode scanning occurs.

A further advantage of embodiments of the present system and method is that the barcode scanner 400 may also be used for tracking operator time and attendance. For example, rather than using a separate system, one or more employees could place a digit on the fingerprint reader 425 on arrival at work to have the time of arrival recorded in the MMD 20. In this case, it may be useful to have the employees enter a code on the keypad 430 to indicate that the next fingerprint read is being input for time and attendance purposes.

It will be apparent to one skilled in the art that various modifications to the invention and embodiments described herein are possible without departing from the spirit and scope of the invention. Accordingly, it is to be understood that the present invention has been described by way of illustration and not limitation.

The invention claimed is:

1. A system for verifying identity during data entry, said system comprising:
   a barcode scanner for scanning barcodes for data entry;
   a fingerprint reader fixedly attached to said barcode scanner;
   an activator for causing said barcode scanner to scan a barcode, wherein said fingerprint reader is positioned on said barcode scanner such that a digit is placed on said fingerprint reader while said activator is operated by an operator;
   a database comprising identification data for barcode scanner users and fingerprint data for said users; and
   a controller, which is in communication with said barcode scanner, said fingerprint reader and said database, that compares fingerprint data from the digit placed on said fingerprint reader with fingerprint data for said operator in said database to obtain identification data of said operator and then associates the identification data with the barcode scanned by said barcode scanner for further analysis, wherein the barcode scanned by said barcode scanner is different from the identification data.

2. The system of claim 1, wherein said fingerprint reader is positioned on said activator.

3. The system of claim 1, wherein said controller controls said barcode scanner such that said barcode scanner will not operate unless said identity of said operator matches with an entry in said database.

4. The system of claim 1, wherein said controller controls said fingerprint reader and said barcode scanner such that said barcode scanner will not operate unless a digit is placed on said fingerprint reader.

* * * * *

UNITED STATES PATENT AND TRADEMARK OFFICE
CERTIFICATE OF CORRECTION

| | |
|---|---|
| PATENT NO. | : 7,878,409 B2 |
| APPLICATION NO. | : 11/297320 |
| DATED | : February 1, 2011 |
| INVENTOR(S) | : Stefano Celestini |

Page 1 of 1

It is certified that error appears in the above-identified patent and that said Letters Patent is hereby corrected as shown below:

Title Page, Item (56), the following two references should be cited:

1. US 2006/0219776; 2006-10-05; Finn; and
2. LABCAL, Mobile Checker, printed December 12, 2006, www.labcal.com/products/mobile_2, including Be.U Mobile SMC-800 MCW product sheet In column 26 line 26, "said" should be "a".

Signed and Sealed this
Twenty-fourth Day of April, 2012

David J. Kappos
*Director of the United States Patent and Trademark Office*